(12) United States Patent  (10) Patent No.: US 12,480,000 B2
Wu et al.  (45) Date of Patent: Nov. 25, 2025

(54) NEAR INFRARED REFLECTIVE COPPER OXIDE COATED PARTICLES

(71) Applicant: Toyota Motor Engineering & Manufacturing North America, Inc., Plano, TX (US)

(72) Inventors: Songtao Wu, Ann Arbor, MI (US); Krishna Gunugunuri, Canton, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 70 days.

(21) Appl. No.: 18/514,434

(22) Filed: Nov. 20, 2023

(65) Prior Publication Data

US 2024/0309217 A1  Sep. 19, 2024

Related U.S. Application Data

(62) Division of application No. 17/168,281, filed on Feb. 5, 2021, now Pat. No. 11,834,579.

(Continued)

(51) Int. Cl.
*C09C 3/06* (2006.01)
*C09C 1/60* (2006.01)
(Continued)

(52) U.S. Cl.
CPC ............... *C09C 3/063* (2013.01); *C09C 1/60* (2013.01); *C09D 5/004* (2013.01); *C09D 5/035* (2013.01); *C01P 2004/84* (2013.01)

(58) Field of Classification Search
CPC .............................. C09C 3/063; C09D 5/035
See application file for complete search history.

(56) References Cited

U.S. PATENT DOCUMENTS 4,483,943 A * 11/1984 Windawi ............. B01J 23/8472
  502/342
5,021,315 A *  6/1991 Goldman ............. G03G 9/0832
  427/217

(Continued)

FOREIGN PATENT DOCUMENTS

CN  101195725 A  6/2008
CN  104530958 A  4/2015

(Continued)

*Primary Examiner* — Robert A Vetere
(74) *Attorney, Agent, or Firm* — Dinsmore & Shohl LLP

(57) ABSTRACT

A method for forming a copper coated particles includes combining a precipitating agent with a solution comprising copper nitrate and particles to forming coated particles. The particles are cobalt oxide ($Co_3O_4$) or carbon black. The coated particles are washed to obtain washed coated particles, the washed coated particles are filtered to obtain filtered coated particles, the filtered coated particles are dried to obtain dried coated particles, and the dried coated particles are calcined to obtain the copper coated particles. The copper coated particles have a reflectivity of electromagnetic radiation in a visible spectrum that is less than or equal to 5%, and a reflectivity of electromagnetic radiation in a near-IR and LiDAR spectrum that is greater than or equal to 5%.

11 Claims, 9 Drawing Sheets

Related U.S. Application Data

(60) Provisional application No. 63/127,439, filed on Dec. 18, 2020.

(51) Int. Cl.
  *C09D 5/03* (2006.01)
  *C09D 5/33* (2006.01)

(56) References Cited

U.S. PATENT DOCUMENTS

| | | |
|---|---|---|
| 5,650,461 A | 7/1997 | Wasserman et al. |
| 6,391,141 B2 | 5/2002 | Boaz |
| 10,215,855 B2 | 2/2019 | Decker et al. |
| 2010/0080898 A1* | 4/2010 | Danner .................. B01J 13/02 427/213.3 |
| 2015/0047417 A1 | 2/2015 | Park et al. |
| 2020/0291257 A1 | 9/2020 | Yamaguchi et al. |

FOREIGN PATENT DOCUMENTS

| | | |
|---|---|---|
| CN | 109021723 A | 12/2018 |
| CN | 109161280 A | 1/2019 |
| CN | 109608953 A | 4/2019 |
| WO | 2019068814 A1 | 4/2019 |

\* cited by examiner

NEAR INFRARED REFLECTIVE COPPER OXIDE COATED PARTICLES

CROSS-REFERENCE TO RELATED APPLICATION

The present application is a divisional of U.S. patent application Ser. No. 17/168,281 filed Feb. 5, 2021, which claims priority to U.S. Provisional Patent Application No. 63/127,439 filed on Dec. 18, 2020, which are incorporated herein by reference in their entirety.

TECHNICAL FIELD

The present specification generally relates to particles that reflect near-IR electromagnetic radiation and, more specifically, to copper oxide coated particles that reflect near-IR electromagnetic radiation.

BACKGROUND

LiDAR systems using pulsed laser electromagnetic radiation with a wavelength of 905 nanometers (nm) or 1050 nm have been proposed and tested for autonomous vehicle obstacle detection and avoidance systems. However, dark colored (e.g., black) pigments used in paint systems to provide a dark color absorb not only visible electromagnetic radiation, which darkens the color, but also absorbs near-IR electromagnetic radiation with wavelengths greater than about 750 nanometers, which includes LiDAR electromagnetic radiation.

Accordingly, a need exists for alternative dark-colored pigments that absorb electromagnetic radiation within the visible spectrum, but that reflect near-IR electromagnetic radiation with wavelengths around 905 nm or 1050 nm.

SUMMARY

A first aspect includes a copper oxide coated pigment comprising: a particle having an outer surface; and a layer of copper oxide on the outer surface of the particle, wherein the copper oxide coated pigment has a reflectivity of electromagnetic radiation in a visible spectrum that is less than or equal to 5%, the copper oxide coated pigment has a reflectivity of electromagnetic radiation in a near-IR and LiDAR spectrum that is greater than or equal to 5%, and the particle is selected from cobalt oxide ($Co_3O_4$) or carbon black.

A second aspect includes the copper oxide coated pigment according to the first aspect, wherein the particle is cobalt oxide ($Co_3O_4$).

A third aspect includes the copper oxide coated pigment according to the first aspect, wherein the particle is carbon black.

A fourth aspect includes the copper oxide coated pigment of any of the first to third aspects, wherein the copper oxide coated pigment has a reflectivity of electromagnetic radiation in the visible spectrum that is less than or equal to 2%.

A fifth aspect includes the copper oxide coated pigment of any of the first to fourth aspects, wherein the copper oxide coated pigment has a reflectivity for electromagnetic radiation in the near-IR and LiDAR spectrum that is greater than or equal to 20%.

A sixth aspect includes the copper oxide coated pigment of any of the first to fifth aspects, wherein the copper oxide coated pigment has a reflectivity for electromagnetic radiation in the visible spectrum that is greater than or equal to 0.5% and less than or equal to 2%.

A seventh aspect includes the copper oxide coated pigment of any of the first to sixth aspects, wherein the copper oxide coated pigment has a reflectivity for electromagnetic radiation in the near-IR and LiDAR spectrum that is greater than or equal to 10% and less than or equal to 65%.

An eighth aspect includes the copper oxide coated pigment of any of the first to seventh aspects, wherein the copper oxide coated pigment has a blackness greater than or equal to 150 and less than or equal to 165.

A ninth aspect includes a paint comprising: a paint binder; and at least one copper oxide coated pigment according to any of the first to eighth aspects.

A tenth aspect includes the paint of the ninth aspect, wherein the paint has a color with a lightness in CIELAB color space less than or equal to 40.

An eleventh aspect includes a vehicle comprising a body panel coated in the paint of the ninth or tenth aspect.

A twelfth aspect includes a method for forming a copper oxide coated particles comprising: combining a precipitating agent with a solution comprising: copper nitrate and particles, thereby forming coated particles and wherein the particles are cobalt oxide ($Co_3O_4$) or carbon black; washing the particles, thereby obtaining washed coated particles; filtering the washed coated particles, thereby obtaining filtered coated particles; drying the filtered coated particles, thereby obtaining dried coated particles; and calcining the dried coated particles to form the copper oxide coated particles.

A thirteenth aspect includes the method of the twelfth aspect, wherein the precipitating agent is selected from the group consisting of sodium hydroxide, sodium carbonate, and ammonium carbonate.

A fourteenth aspect includes the method of the twelfth or thirteenth aspect, wherein the precipitating agent is ammonium carbonate.

A fifteenth aspect includes the method of any one of the twelfth to fourteenth aspects, wherein the particles are cobalt oxide ($Co_3O_4$).

A sixteenth aspect includes the method of any one of the twelfth to fifteenth aspects, wherein the particles are carbon black particles.

A seventeenth aspect includes the method of any one of the twelfth to sixteenth aspects, wherein the coated particles comprise copper nitrate coated particles, copper hydroxide coated particles, or copper carbonate coated particles.

An eighteenth aspect includes the method of any one of the twelfth to seventeenth aspects, wherein washing the coated particles comprises washing the coated particles in a mixture of ethanol and water.

A nineteenth aspect includes the method of fifteenth aspect, wherein drying the filtered coated particles comprises drying the filtered coated particles at a temperature greater than or equal to 100° C. and less than or equal to 140° C. for a duration greater than or equal to 0.5 hours and less than or equal to 5.0 hours.

A twentieth aspect includes the method of the nineteenth aspect, wherein calcining the dried coated particles comprises calcining the dried coated particles at a temperature greater than or equal to 430° C. and less than or equal to 470° C. for a duration greater than or equal to 0.5 hours and less than or equal to 5.0 hours.

A twenty-first aspect includes the method of the sixteenth aspect, wherein drying the filtered coated particles comprises drying the filtered coated particles at a temperature greater than or equal to 100° C. and less than or equal to 140° C. for a duration greater than or equal to 5 hours and less than or equal to 15 hours.

A twenty-second aspect includes the method of the twenty-first aspect, wherein calcining the dried coated particles comprises calcining the dried coated particles at a temperature greater than or equal to 200° C. and less than or equal to 300° C. for a duration greater than or equal to 0.5 hours and less than or equal to 5.0 hours.

A twenty-third aspect includes a method for forming a copper oxide coated cobalt oxide particles comprising: combining a sodium carbonate precipitating agent with a solution comprising: copper nitrate and cobalt nitrate, thereby forming coated cobalt oxide particles; washing the coated cobalt oxide particles, thereby obtaining washed coated cobalt oxide particles; filtering the washed coated cobalt oxide particles, thereby obtaining filtered coated cobalt oxide particles; drying the filtered coated cobalt oxide particles, thereby obtaining dried coated cobalt oxide particles; and calcining the dried coated cobalt oxide particles to form copper oxide coated cobalt oxide particles.

A twenty-fourth aspect includes the method of the twenty-third aspect, wherein the coated cobalt oxide particles comprise copper nitrate coated cobalt oxide.

A twenty-fifth aspect includes the method of the twenty-third or twenty-fourth aspects, wherein drying the filtered coated cobalt oxide particles comprising drying the filter coated cobalt oxide particles at a temperature greater than or equal to 100° C. and less than or equal to 140° C. for a duration greater than or equal to 0.5 hours and less than or equal to 5.0 hours.

The twenty-sixth aspect includes the method of any one of the twenty-third to twenty-fifth aspects, wherein calcining the dried coated cobalt oxide particles comprises calcining the dried coated cobalt oxide particles at a temperature greater than or equal to 430° C. and less than or equal to 470° C. for a duration greater than or equal to 0.5 hours and less than or equal to 5.0 hours.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
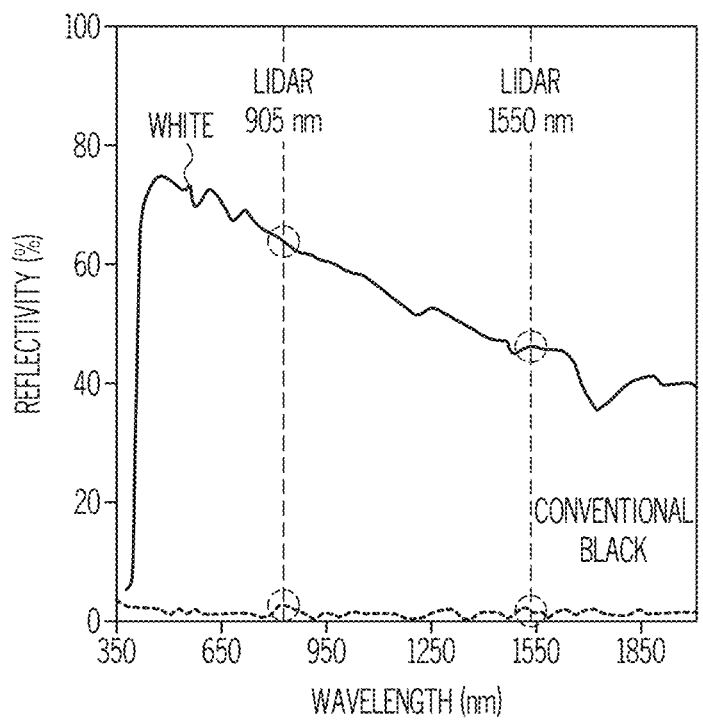
FIG. 1A graphically depicts the reflectivity versus wavelength of electromagnetic radiation for conventional colorants.

According to one or more embodiments described herein, a copper oxide coated cobalt oxide pigment comprises: a cobalt oxide particle having an outer surface; and a layer of copper oxide on the outer surface of the cobalt oxide particle, wherein the copper oxide coated cobalt oxide pigment has a reflectivity of electromagnetic radiation in a visible spectrum that is less than or equal to 5%, and the copper oxide coated cobalt oxide pigment has a reflectivity of electromagnetic radiation in a near-IR and LiDAR spectrum that is greater than or equal to 5%.

According to one or more embodiments described herein, a copper oxide coated carbon black pigment comprises: a carbon black particle having an outer surface; and a layer of copper oxide on the outer surface of the carbon black particle, wherein the copper oxide coated carbon pigment has a reflectivity of electromagnetic radiation in a visible spectrum that is less than or equal to 5%, and the copper oxide coated carbon black pigment has a reflectivity of electromagnetic radiation in a near-IR and LiDAR spectrum that is greater than or equal to 5%.

Accordingly, copper oxide coated particles disclosed and described herein display a dark color and reflect near-IR electromagnetic radiation, which includes LiDAR, with wavelengths between and including 850 nm and 1550 nm. In embodiments, the copper oxide coated particles disclosed and described herein can be included in a paint system to form a near-IR and LiDAR-reflecting dark colored paint that can be used in any application for which traditional paints are used. For examples, paint systems disclosed and described herein may be used to coat portions of a vehicle, buildings, roadways, traffic markers, or any other object so that near-IR and LiDAR detection systems can detect an article coated with the near-IR and LiDAR reflecting dark colored paint. In embodiments, the copper oxide coated particles disclosed and described herein can be used in black-colored paints, or the copper oxide coated particles can be used with other pigments or colorants in paints of any color.

As used herein, the term "near-IR electromagnetic radiation" refers to electromagnetic radiation with wavelengths between and including 750 nm and 950 nm, and "LiDAR" refers to electromagnetic radiation with wavelengths between and including 905 nm to 1550 nm.

As used herein, the term "visible spectrum" refers to electromagnetic radiation with wavelengths between and including 350 nm and 750 nm.

The LiDAR reflecting paint may be disposed on surfaces to provide a LiDAR reflecting colored surface. The color of the surface may be black, but it may also by any other color by incorporating the copper oxide coated particles disclosed and described herein with other pigments and colorants. Non-limiting examples of used for paints disclosed and described herein include surfaces of vehicle body panels such as vehicle door panels, vehicle quarter panels, and the like as well as surfaces of buildings, surfaces of roadways, surfaces of traffic markers, and other surfaces where it is desired to reflect near-IR or LiDAR. Utilization of the LiDAR reflecting copper oxide coated particles allow vehicles, and even dark-colored vehicles, or other surfaces to be detected with a LiDAR system. Various embodiments of LiDAR reflecting copper oxide coated c particles and methods for making and using the same will be described in further detail herein with specific reference to the appended drawings.

One difficulty in forming dark-colored (such as black) particles and paint systems comprising dark-colored particles that reflect LiDAR or near-IR electromagnetic radiation is the close proximity of the visible spectrum of electromagnetic radiation and near-IR electromagnetic radiation or LiDAR. Materials that provide a dark color, such as black, do not reflect electromagnetic radiation within the visible spectrum of electromagnetic radiation. Such materials will generally also not reflect electromagnetic radiation just outside of the visible spectrum of electromagnetic radiation, such as near-IR and LiDAR. Carbon black is one such material that is commonly used as a dark pigment and does not reflect electromagnetic radiation in the visible spectrum and also does not reflect near-IR or LiDAR electromagnetic radiation. Accordingly, a material that does not reflect electromagnetic radiation within the visible spectrum but that does reflect near-IR or LiDAR electromagnetic radiation is required to have a very sharp increase in reflectivity just outside of the visible spectrum of electromagnetic radiation.

With reference now to FIG. 1A, the reflectivity of materials that are commonly used as colorants in a paint system are shown. The percentage of reflectivity is presented along the y-axis of FIG. 1A and the wavelength of the electromagnetic radiation is provided along the x-axis of FIG. 1A. The reflectivity of a conventional black colorant, such as carbon black, is shown along the bottom of the graph. As shown in FIG. 1A, the carbon black colorant does not reflect electromagnetic radiation in the visible spectrum (to the left of the graph). As shown in FIG. 1A, the reflection of this black colorant is near zero percent within the visible spectrum of electromagnetic radiation. This indicates that the colorant provides a dark, nearly pure black color. However, this conventional colorant also reflects around zero percent of electromagnetic radiation outside of the visible spectrum (to the right on the graph), such as near-IR electromagnetic radiation or LiDAR electromagnetic radiation (e.g., from greater than about 750 nanometers (nm) to about 1550 nm).

Similarly, near the top of the graph is shown the reflectivity of white $TiO_2$, which is used as a conventional white colorant. As shown in FIG. 1A, white $TiO_2$ reflects near-IR and LiDAR electromagnetic radiation as shown on the right side of the graph (e.g., from greater than about 750 nm to 1550 nm) where the reflection of near-IR and LiDAR electromagnetic radiation is greater than forty percent at 1550 nm, and around sixty percent at 905 nm. However, white $TiO_2$, as the name indicates, also reflects electromagnetic radiation within the visible spectrum. As shown in FIG. 1A, white $TiO_2$ reflects nearly eighty percent of electromagnetic radiation within the visible spectrum. Accordingly, neither of these colorants—carbon black or white $TiO_2$ are suitable as a dark-colored particle that also reflects near-IR or LiDAR electromagnetic radiation.

Figure 1B:
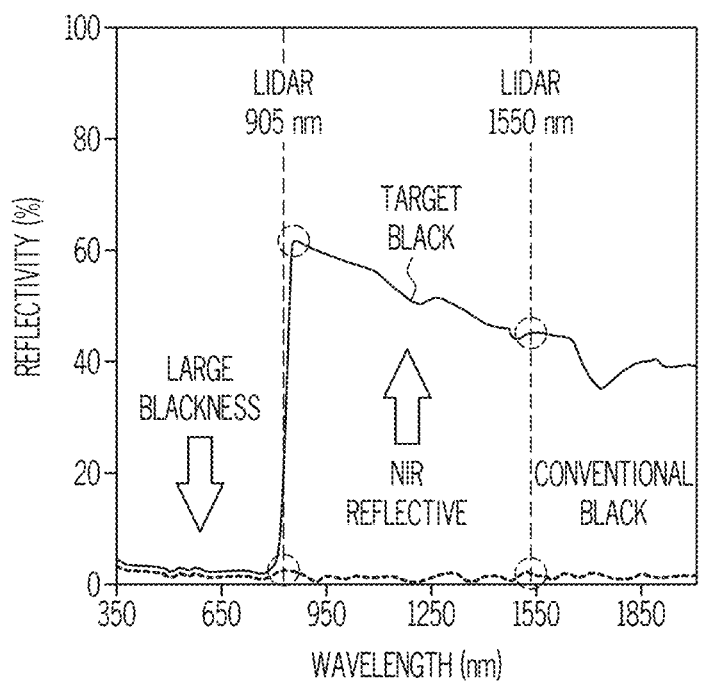
FIG. 1B graphically depicts the reflectivity versus wavelength of electromagnetic radiation for colorants according to embodiments disclosed and described herein.

FIG. 1B is a graph showing the target conditions of a particle that does not reflect light in the visible spectrum of electromagnetic radiation but that does reflect near-IR and LiDAR electromagnetic radiation. In FIG. 1B, the percentage of reflectivity is measured along the y-axis and the wavelength of electromagnetic radiation is provided along the x-axis. Along the bottom of the graph is shown the reflectivity of a conventional black colorant, which is identical to the reflectivity of the conventional black colorant (such as carbon black) shown in FIG. 1A. As shown in FIG. 1B, particles that do not reflect electromagnetic radiation within the visible spectrum and that reflect near-IR and LiDAR electromagnetic radiation have at least two distinct regions of reflection. The first region of reflection is within the visible spectrum of electromagnetic radiation, indicated as "1" on the left side of the graph in FIG. 1B. In this region of reflection, particles that do not reflect electromagnetic within the visible spectrum and that reflect near-IR and LiDAR electromagnetic radiation will behave the same as conventional black colorants (such as carbon black) by not reflecting electromagnetic radiation within the visible spectrum. As shown in FIG. 1B, particles that do not reflect electromagnetic within the visible spectrum and that reflect near-IR and LiDAR electromagnetic radiation reflect nearly zero percent of electromagnetic radiation within the visible spectrum, but these particles have a second region of reflection that is outside of the visible spectrum of electromagnetic radiation.

The second region of reflection encompasses electromagnetic radiation with wavelengths including and between 750 nm and 1050 nm (which includes near-IR and LiDAR electromagnetic radiation). In the second region of reflection, the particles that do not reflect electromagnetic within the visible spectrum and that reflect near-IR and LiDAR electromagnetic radiation perform similarly as white $TiO_2$ by reflecting a high amount of electromagnetic radiation within the second region of reflection. As shown in FIG. 1B, particles that do not reflect electromagnetic within the visible spectrum and that reflect near-IR and LiDAR electromagnetic radiation reflect, for example, about sixty percent of LiDAR electromagnetic radiation having a wavelength of 905 nm and reflect greater than forty percent of LiDAR electromagnetic radiation having a wavelength of 1550 nm. By having reflectance in the second region of reflection that is similar to white $TiO_2$, particles can reflect a sufficient amount of near-IR and LiDAR electromagnetic radiation that the particles can be detected by LiDAR systems.

FIG. 1B shows the difficulty in forming particles that do not reflect electromagnetic within the visible spectrum and that reflect near-IR and LiDAR electromagnetic radiation. Particularly, FIG. 1B shows a steep increase in reflectance just outside of the visible spectrum of electromagnetic radiation. In embodiments, this steep increase of reflectance is present at a wavelength of electromagnetic radiation that is at or about 905 nm, which is a wavelength of electromagnetic radiation commonly used in LiDAR systems. As shown in FIG. 1B, the reflectance increases from about zero percent to nearly sixty percent at a wavelength of electromagnetic radiation that is about 905 nm. Forming a particle with such a precise and steep increase in reflectance is difficult to achieve and there is very little room for error. For instance, if the material reflects too much electromagnetic radiation within the visible spectrum, the appearance of the color will not be pure black, but will have hints of, for example, red or purple. However, if the material does not reflect a sufficient amount of near-IR or LiDAR electromagnetic radiation, the material will not be suitable for detection by LiDAR systems.

Figure 2:
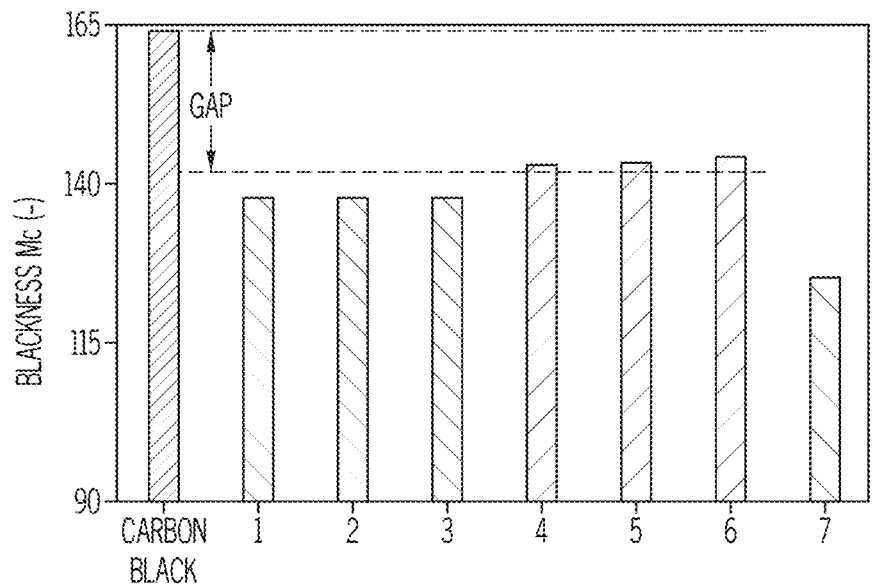
FIG. 2 is a bar graph depicting the blackness of commercially available materials and black $TiO_2$.

Some materials do not reflect electromagnetic radiation within much of the visible spectrum and reflect near-IR and LiDAR electromagnetic radiation; however, these materials have not been able to reproduce the visible appearance of carbon black (i.e., having a reflectivity of about zero percent for electromagnetic radiation within the visible spectrum). One such material that has gained interest is chromium iron oxide and derivatives thereof. Although chromium iron oxide materials can generally reflect near-IR and LiDAR electromagnetic radiation, colorants made from chromium iron oxide materials are generally referred to as "cool black" because colorants made from chromium iron oxide or derivatives thereof have hints of red or blue in them. FIG. 2 is a bar graph that shows the blackness of various materials on the y-axis. Blackness is measured by X-Rite Spectrophotometer. At the far left of FIG. 2 is carbon black, which is the material commonly used as a black colorant, but carbon black does not reflect near-IR or LiDAR electromagnetic radiation. As shown in FIG. 2, carbon black has a blackness of about 165. Materials 1-7 are chromium iron oxide containing materials that reflect near-IR and LiDAR electromagnetic radiation, but as can be seen in FIG. 2, these materials have a blackness that is around 142 or less. This difference in blackness is notable, as materials 1-7 have tints of red or blue. This considerable gap in blackness between carbon black and materials 1-7 show that materials 1-7 are generally not suitable to be used in applications where pure black is desired, such as, for example, in paints generally, and in paints for automobiles.

Another material of interest for black color applications is Copper (II) oxide or cupric oxide (CuO). CuO a common inorganic compound that is a black-colored solid material in its natural state. However, not all copper oxides have this black color. Namely, another stable oxide of copper is cuprous oxide ($Cu_2O$) that is a red solid in its natural state. Therefore, the oxidation state of copper is important to ensure that the material has a black color. CuO is a product of copper mining and it is a precursor to many other copper-containing products and chemical compounds. CuO has been used as a black pigment in certain applications, such as in ceramics, glazes, and the like. However, CuO does not reflect near-IR or LiDAR electromagnetic radiation. That is, CuO in its natural state behaves much like carbon black in that it does not reflect electromagnetic radiation in the visible spectrum and it also does not reflect electromagnetic radiation in the near-IR or LiDAR spectrum. Without being bound to any particular theory, CuO has a band gap of 2.0 eV that, as described in more detail below, does not readily reflect electromagnetic radiation in the near-IR or LiDAR spectrum. When manipulating CuO to have a band gap that is more amenable to reflecting electromagnetic radiation in the near-IR or LiDAR spectrum, the color of the CuO degrades to a brownish black, which is not suitable for certain applications, such as in an paints in general and, particularly, automotive paint.

The band gap generally refers to the energy difference (in electron volts or eV) between the top of the valence band (VB) and the bottom of the conduction band (CB). The VB is the band of electron orbitals that electrons can jump out of, moving into the CB when excited. The VB is the outermost electron orbital of an atom that electrons can actually occupy. The band gap is the energy required for an electron to move from the VB to the CB and can be indicative of the electrical conductivity of the material. In optics, the band gap correlates to the threshold where photons can be absorbed by a material. Therefore, the band gap determines what portion of the electromagnetic spectrum the material can absorb. Generally, a material with a large band gap will absorb a greater portion of electromagnetic spectra having a short wavelength and a material with a small band gap will absorb a greater portion of electromagnetic spectra having long wavelengths. Put differently, a large band gap means that a lot of energy is required to excite valence electrons to the CB. In contrast, when the valence band and conduction band overlap, as they do in metals, electrons can readily jump between the two bands, which means that the material is highly conductive. However, it has been found that by manipulating the band gap of a material, the types of electromagnetic spectra that are absorbed by the material may be controlled.

Generally, a band gap of from 1.5 eV to 1.8 eV is required for a compound to absorb (i.e., not reflect) electromagnetic radiation in the visible spectrum and reflect electromagnetic radiation in the near-IR and LiDAR spectrum. Without manipulation, bulk CuO does not meet these requirements. Bulk CuO has a reported band gap of 2.0 eV and a blackness of 120. This band gap is outside of the 1.5 eV to 1.8 eV that is believed to reflect electromagnetic radiation in the near-IR and LiDAR spectrum. Further, as noted above with reference to FIG. 2, a blackness of 120 is significantly lower than the blackness of 170 for carbon black. Accordingly, in embodiments disclosed and described herein, CuO is manipulated by reducing the particle size of the CuO to decrease the bandgap of CuO and to increase the blackness of CuO.

As noted above, bulk CuO is not suitable as a colorant that absorbs (i.e., does not reflect) electromagnetic radiation in the visible spectrum and that reflects electromagnetic radiation in the near-IR or LiDAR spectrum, as is indicated by its band gap of about 2.0 eV. However, according to embodiments disclosed and described herein, reducing the size of the CuO particles causes the band gap to decrease and the increases the blackness of the CuO particles. According to embodiments, the bulk CuO particles are reduced to nanoscale particles (also referred to herein as "nanoparticles"). This reduction in size of the bulk CuO particles can be completed by any suitable method, such as milling, ball milling, jet milling, and the like. In embodiments, the bulk CuO particles are reduced to have an crystal size that is less than or equal to 100 nm, such as less than or equal to 95 nm, less than or equal to 90 nm, less than or equal to 85 nm, less than or equal to 80 nm, less than or equal to 75 nm, less than or equal to 70 nm, less than or equal to 65, less than or equal to 60 nm, less than or equal to 55 nm, less than or equal to 50 nm, less than or equal to 45 nm, less than or equal to 40 nm, less than or equal to 35 nm, less than or equal to 30 nm, less than or equal to 25 nm, less than or equal to 20 nm, less than or equal to 15 nm, or less than or equal to 10 nm.

In embodiments, the bulk CuO particles are reduced to have an average particle size that is less than or equal to 60 nm and greater than or equal to 10 nm, such as less than or equal to 55 nm and greater than or equal to 10 nm, less than or equal to 50 nm and greater than or equal to 10 nm, less than or equal to 45 nm and greater than or equal to 10 nm, less than or equal to 40 nm and greater than or equal to 10 nm, less than or equal to 35 nm and greater than or equal to 10 nm, less than or equal to 30 nm and greater than or equal to 10 nm, less than or equal to 25 nm and greater than or equal to 10 nm, less than or equal to 20 nm and greater than or equal to 10 nm, less than or equal to 15 nm and greater than or equal to 10 nm, less than or equal to 60 nm and greater than or equal to 15 nm, as less than or equal to 55 nm and greater than or equal to 15 nm, less than or equal to 50 nm and greater than or equal to 15 nm, less than or equal to 45 nm and greater than or equal to 15 nm, less than or equal to 40 nm and greater than or equal to 15 nm, less than or equal to 35 nm and greater than or equal to 15 nm, less than or equal to 30 nm and greater than or equal to 15 nm, less than or equal to 25 nm and greater than or equal to 15 nm, less than or equal to 20 nm and greater than or equal to 15 nm, less than or equal to 60 nm and greater than or equal to 20 nm, as less than or equal to 55 nm and greater than or equal to 20 nm, less than or equal to 50 nm and greater than or equal to 20 nm, less than or equal to 45 nm and greater than or equal to 20 nm, less than or equal to 40 nm and greater than or equal to 20 nm, less than or equal to 35 nm and greater than or equal to 20 nm, less than or equal to 30 nm and greater than or equal to 20 nm, less than or equal to 25 nm and greater than or equal to 20 nm, less than or equal to 60 nm and greater than or equal to 25 nm, as less than or equal to 55 nm and greater than or equal to 25 nm, less than or equal to 50 nm and greater than or equal to 25 nm, less than or equal to 45 nm and greater than or equal to 25 nm, less than or equal to 40 nm and greater than or equal to 25 nm, less than or equal to 35 nm and greater than or equal to 25 nm, less than or equal to 30 nm and greater than or equal to 25 nm, less than or equal to 60 nm and greater than or equal to 30 nm, as less than or equal to 55 nm and greater than or equal to 30 nm, less than or equal to 50 nm and greater than or equal to 30 nm, less than or equal to 45 nm and greater than or equal to 30 nm, less than or equal to 40 nm and greater than or equal to 30 nm, less than or equal to 35 nm and greater than or equal to 30 nm, less than or equal to 60 nm and greater than or equal to 35 nm, as less than or equal to 55 nm and greater than or equal to 35 nm, less than or equal to 50 nm and greater than or equal to 35 nm, less than or equal to 45 nm and greater than or equal to 35 nm, less than or equal to 40 nm and greater than or equal to 35 nm, less than or equal to 60 nm and greater than or equal to 40 nm, as less than or equal to 55 nm and greater than or equal to 40 nm, less than or equal to 50 nm and greater than or equal to 40 nm, less than or equal to 45 nm and greater than or equal to 40 nm, less than or equal to 60 nm and greater than or equal to 45 nm, as less than or equal to 55 nm and greater than or equal to 45 nm, less than or equal to 50 nm and greater than or equal to 45 nm, less than or equal to 60 nm and greater than or equal to 50 nm, as less than or equal to 55 nm and greater than or equal to 50 nm, or less than or equal to 60 nm and greater than or equal to 55 nm. Bulk CuO particles that have been reduced to nanoparticles are referred to herein as "CuO nanoparticles."

By reducing the size of bulk CuO particles, such as to the average particle sizes disclosed herein, the band gap of the CuO decreases. In embodiments, the band gap as measured by X-ray photoelectron spectroscopy (XPS) of the CuO nanoparticles is greater than or equal to 1.6 eV and less than or equal to 1.9 eV, such as greater than or equal to 1.6 eV and less than or equal to 1.8 eV, greater than or equal to 1.6 eV and less than or equal to 1.7 eV, greater than or equal to 1.7 eV and less than or equal to 1.9 eV, greater than or equal to 1.7 eV and less than or equal to 1.8 eV, greater than or equal to 1.7 eV and less than or equal to 1.9 eV, greater than or equal to 1.7 eV and less than or equal to 1.8 eV, or greater than or equal to 1.8 eV and less than or equal to 1.9 eV. Without being bound by any particular theory, it is believed that surface defects caused by reducing bulk CuO to CuO nanoparticles decreases the band gap of the CuO nanoparticles in comparison to the band gap of bulk CuO particles. It is further believed that the smaller the average crystal size of the CuO nanoparticles, the lower the band gap of the CuO nanoparticles will be. Thus, by reducing bulk CuO particles to CuO nanoparticles according to embodiments disclosed and described herein, the band gap of the CuO nanoparticles is within the range that will reflect electromagnetic radiation within the near-IR and LiDAR spectrum, such as having a band gap that is between 1.5 eV and 2.0 eV or between 1.5 eV and 1.8 eV.

The blackness (i.e., a measure of blackness) also increases as the size of the bulk CuO decreases. Accordingly, in embodiments, the blackness of the CuO nanoparticles is greater than or equal to 130 and less than or equal to 145, such as greater than or equal to 133 and less than or equal to 145, greater than or equal to 135 and less than or equal to 145, greater than or equal to 138 and less than or equal to 145, greater than or equal to 140 and less than or equal to 145, greater than or equal to 143 and less than or equal to 145, greater than or equal to 130 and less than or equal to 143, greater than or equal to 133 and less than or equal to 143, greater than or equal to 135 and less than or equal to 143, greater than or equal to 138 and less than or equal to 143, greater than or equal to 140 and less than or equal to 143, greater than or equal to 130 and less than or equal to 140, greater than or equal to 133 and less than or equal to 140, greater than or equal to 135 and less than or equal to 140, greater than or equal to 138 and less than or equal to 140, greater than or equal to 130 and less than or equal to 138, greater than or equal to 133 and less than or equal to 138, greater than or equal to 135 and less than or equal to 138, greater than or equal to 130 and less than or equal to 135, greater than or equal to 133 and less than or equal to 135, or greater than or equal to 130 and less than or equal to 133. Even with the increase in blackness by reducing the particle size of bulk CuO, the blackness of the CuO nanoparticles is lower than what is desired for certain applications, such as paints generally, and particularly automotive paint.

According to embodiments disclosed and described herein, the low blackness of the CuO nanoparticles (in comparison to the 170 blackness of carbon black) is addressed by depositing a CuO layer on the surface of particles that have a blackness greater than the blackness of the CuO nanoparticles. According to embodiments, CuO is deposited on carbon black or cobalt oxide ($Co_3O_4$) particles to improve the blackness. As disclosed above, carbon black has a very high blackness. Particles of $Co_3O_4$ are also known to have a high blackness, such as a blackness that is greater than the blackness of the CuO nanoparticles.

Figure 3:
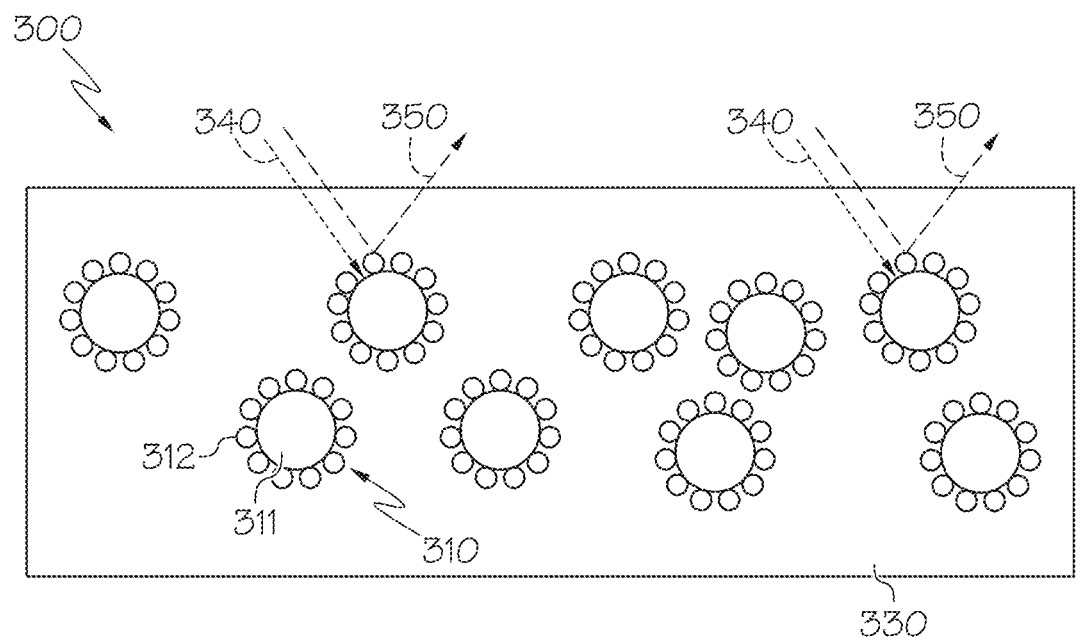
FIG. 3 schematically depicts a system including copper oxide coated cobalt oxide particles according to embodiments disclosed and described herein.

The effect of a system having a CuO layer coated on carbon black or $Co_3O_4$ particles will be described with reference to FIG. 3. The copper oxide coated particle system 300 comprises copper oxide coated particles 310 comprising carbon black or $Co_3O_4$ particles 311 coated with a layer of CuO 312. As shown in FIG. 3, according to embodiments the CuO 312 is deposited on the exterior surface of the larger carbon black or $Co_3O_4$ particles 311 having a particle size of greater than or equal to 1 μm and less than or equal to 10 μm. As shown in FIG. 3, the copper oxide coated particles 310 can be suspended in a transparent carrier 330, which is not limited and can be any suitable carrier for a desired application. The carrier 330 will be described in further detail infra. Electromagnetic radiation in both the visible spectrum 340 and electromagnetic radiation in the near-IR and LiDAR spectrum 350 incident to the copper oxide coated particle system 300 enters the copper oxide coated particle system 300 and passes through the transparent carrier 330 where it is incident to a copper oxide coated particle 310. A portion of the electromagnetic radiation in the visible spectrum 340 is absorbed by the copper oxide 312, and a portion of the electromagnetic radiation in the visible spectrum 340 is transmitted by the copper oxide 312 and becomes incident to the carbon black or cobalt oxide particle 311. The portion of the electromagnetic radiation in the visible spectrum 340 that is incident to the carbon black or cobalt oxide particle 311 is absorbed by the carbon black or cobalt oxide particle 311 such that little to no electromagnetic radiation in the visible spectrum 340 is reflected out of the copper oxide coated particle system 300.

The electromagnetic radiation in the near-IR and LiDAR spectrum 350 that is incident to the copper oxide coated particle 310 is reflected by the copper oxide 312 such that a majority of electromagnetic radiation in the near-IR and LiDAR spectrum 350 is reflected out of the copper oxide coated particle system 300. Any electromagnetic radiation in the near-IR and LiDAR spectrum 350 that is not reflected by the copper oxide 312 is absorbed by the carbon black or cobalt oxide particles 311.

There is an inverse relationship between the amount of copper oxide 312 on the copper oxide coated particles 310 and the blackness of the copper oxide coated particles 310. In other words, the lesser the content of copper oxide 312 in the copper oxide coated particles 310, the greater the blackness. However, there is a direct relationship between the amount of copper oxide 312 in the copper oxide coated particles 310 and the reflectance of electromagnetic radiation in the near-IR and LiDAR spectrum. In other words, the greater the amount of copper oxide 312 in the copper oxide coated particles 310, the more electromagnetic radiation in the near-IR and LiDAR spectrum will be reflected. Accordingly, embodiments of copper oxide coated particles 310 strikes a balance between the amount of copper oxide 312 and carbon black or cobalt oxide 311.

In embodiments, the copper oxide coated particle 310 may comprise copper oxide 312 in amounts of greater than or equal to 1.0 wt. % and less than or equal to 90.0 wt. % based on the total weight of the copper oxide coated particle 310, such as greater than or equal to 10.0 wt. % and less than or equal to 90.0 wt. %, greater than or equal to 20.0 wt. % and less than or equal to 90.0 wt. %, greater than or equal to 30.0 wt. % and less than or equal to 90.0 wt. %, greater than or equal to 40.0 wt. % and less than or equal to 90.0 wt. %, greater than or equal to 50.0 wt. % and less than or equal to 90.0 wt. %, greater than or equal to 60.0 wt. % and less than or equal to 90.0 wt. %, greater than or equal to 70.0 wt. % and less than or equal to 90.0 wt. %, greater than or equal to 80.0 wt. % and less than or equal to 90.0 wt. %, greater than or equal to 1.0 wt. % and less than or equal to 80.0 wt. %, greater than or equal to 10.0 wt. % and less than or equal to 80.0 wt. %, greater than or equal to 20.0 wt. % and less than or equal to 80.0 wt. %, greater than or equal to 30.0 wt. % and less than or equal to 80.0 wt. %, greater than or equal to 40.0 wt. % and less than or equal to 80.0 wt. %, greater than or equal to 50.0 wt. % and less than or equal to 80.0 wt. %, greater than or equal to 60.0 wt. % and less than or equal to 80.0 wt. %, greater than or equal to 70.0 wt. % and less than or equal to 80.0 wt. %, greater than or equal to 25.0 wt. % and less than or equal to 75.0 wt. %, greater than or equal to 1.0 wt. % and less than or equal to 70.0 wt. %, greater than or equal to 10.0 wt. % and less than or equal to 70.0 wt. %, greater than or equal to 20.0 wt. % and less than or equal to 70.0 wt. %, greater than or equal to 30.0 wt. % and less than or equal to 70.0 wt. %, greater than or equal to 40.0 wt. % and less than or equal to 70.0 wt. %, greater than or equal to 50.0 wt. % and less than or equal to 70.0 wt. %, greater than or equal to 60.0 wt. % and less than or equal to 70.0 wt. %, greater than or equal to 1.0 wt. % and less than or equal to 60.0 wt. %, greater than or equal to 10.0 wt. % and less than or equal to 60.0 wt. %, greater than or equal to 20.0 wt. % and less than or equal to 60.0 wt. %, greater than or equal to 30.0 wt. % and less than or equal to 60.0 wt. %, greater than or equal to 40.0 wt. % and less than or equal to 60.0 wt. %, greater than or equal to 50.0 wt. % and less than or equal to 60.0 wt. %, greater than or equal to 1.0 wt. % and less than or equal to 50.0 wt. %, greater than or equal to 10.0 wt. % and less than or equal to 50.0 wt. %, greater than or equal to 20.0 wt. % and less than or equal to 50.0 wt. %, greater than or equal to 30.0 wt. % and less than or equal to 50.0 wt. %, greater than or equal to 40.0 wt. % and less than or equal to 50.0 wt. %, greater than or equal to 1.0 wt. % and less than or equal to 40.0 wt. %, greater than or equal to 10.0 wt. % and less than or equal to 40.0 wt. %, greater than or equal to 20.0 wt. % and less than or equal to 40.0 wt. %, greater than or equal to 30.0 wt. % and less than or equal to 40.0 wt. %, greater than or equal to 1.0 wt. % and less than or equal to 30.0 wt. %, greater than or equal to 10.0 wt. % and less than or equal to 30.0 wt. %, greater than or equal to 20.0 wt. % and less than or equal to 30.0 wt. %, greater than or equal to 1.0 wt. % and less than or equal to 20.0 wt. %, greater than or equal to 10.0 wt. % and less than or equal to 20.0 wt. %, or greater than or equal to 1.0 wt. % and less than or equal to 10.0 wt. %.

In embodiments, the copper oxide coated particle 310 may comprise carbon black or cobalt oxide 311 in amounts of greater than or equal to 10.0 wt. % and less than or equal to 99.0 wt. % based on the total weight of the copper oxide coated particle 310, such as greater than or equal to 20.0 wt. % and less than or equal to 99.0 wt. %, greater than or equal to 30.0 wt. % and less than or equal to 99.0 wt. %, greater than or equal to 40.0 wt. % and less than or equal to 99.0 wt. %, greater than or equal to 50.0 wt. % and less than or equal to 99.0 wt. %, greater than or equal to 60.0 wt. % and less than or equal to 99.0 wt. %, greater than or equal to 70.0 wt. % and less than or equal to 99.0 wt. %, greater than or equal to 80.0 wt. % and less than or equal to 99.0 wt. %, greater than or equal to 90.0 wt. % and less than or equal to 99.0 wt. %, greater than or equal to 10.0 wt. % and less than or equal to 90.0 wt. %, greater than or equal to 20.0 wt. % and less than or equal to 90.0 wt. %, greater than or equal to 30.0 wt. % and less than or equal to 90.0 wt. %, greater than or equal to 40.0 wt. % and less than or equal to 90.0 wt. %, greater than or equal to 50.0 wt. % and less than or equal to 90.0 wt. %, greater than or equal to 60.0 wt. % and less than or equal to 90.0 wt. %, greater than or equal to 70.0 wt. % and less than or equal to 90.0 wt. %, greater than or equal to 80.0 wt. % and less than or equal to 90.0 wt %, greater than or equal to 10.0 wt. % and less than or equal to 80.0 wt. %, greater than or equal to 20.0 wt. % and less than or equal to 80.0 wt. %, greater than or equal to 30.0 wt. % and less than or equal to 80.0 wt. %, greater than or equal to 40.0 wt. % and less than or equal to 80.0 wt. %, greater than or equal to 50.0 wt. % and less than or equal to 80.0 wt. %, greater than or equal to 60.0 wt. % and less than or equal to 80.0 wt. %, greater than or equal to 70.0 wt. % and less than or equal to 80.0 wt. %, greater than or equal to 10.0 wt. % and less than or equal to 70.0 wt. %, greater than or equal to 20.0 wt. % and less than or equal to 70.0 wt. %, greater than or equal to 30.0 wt. % and less than or equal to 70.0 wt. %, greater than or equal to 40.0 wt. % and less than or equal to 70.0 wt. %, greater than or equal to 50.0 wt. % and less than or equal to 70.0 wt. %, greater than or equal to 60.0 wt. % and less than or equal to 70.0 wt. %, greater than or equal to 10.0 wt. % and less than or equal to 60.0 wt. %, greater than or equal to 20.0 wt. % and less than or equal to 60.0 wt. %, greater than or equal to 30.0 wt. % and less than or equal to 60.0 wt. %, greater than or equal to 40.0 wt. % and less than or equal to 60.0 wt. %, greater than or equal to 50.0 wt. % and less than or equal to 60.0 wt. %, greater than or equal to 10.0 wt. % and less than or equal to 50.0 wt. %, greater than or equal to 20.0 wt. % and less than or equal to 50.0 wt. %, greater than or equal to 30.0 wt. % and less than or equal to 50.0 wt. %, greater than or equal to 40.0 wt. % and less than or equal to 50.0 wt. %, greater than or equal to 10.0 wt. % and less than or equal to 40.0 wt. %, greater than or equal to 20.0 wt. % and less than or equal to 40.0 wt. %, greater than or equal to 30.0 wt. % and less than or equal to 40.0 wt. %, greater than or equal to 10.0 wt. % and less than or equal to 30.0 wt. %, greater than or equal to 20.0 wt. % and less than or equal to 30.0 wt. %, or greater than or equal to 10.0 wt. % and less than or equal to 20.0 wt %.

According to embodiments, the copper oxide coated particle 310 has a blackness before a clear coat is applied that is greater than or equal to 150 and less than or equal to 165, such as greater than or equal to 152 and less than or equal to 165, greater than or equal to 155 and less than or equal to 165, greater than or equal to 158 and less than or equal to 165, greater than or equal to 160 and less than or equal to 165, greater than or equal to 162 and less than or equal to 165, greater than or equal to 150 and less than or equal to 162, greater than or equal to 152 and less than or equal to 162, greater than or equal to 155 and less than or equal to 162, greater than or equal to 158 and less than or equal to 162, greater than or equal to 160 and less than or equal to 162, greater than or equal to 150 and less than or equal to 160, greater than or equal to 152 and less than or equal to 160, greater than or equal to 155 and less than or equal to 160, greater than or equal to 158 and less than or equal to 160, greater than or equal to 150 and less than or equal to 158, greater than or equal to 152 and less than or equal to 158, greater than or equal to 155 and less than or equal to 158, greater than or equal to 150 and less than or equal to 155, greater than or equal to 152 and less than or equal to 155, or greater than or equal to 150 and less than or equal to 152.

Figure 4A:
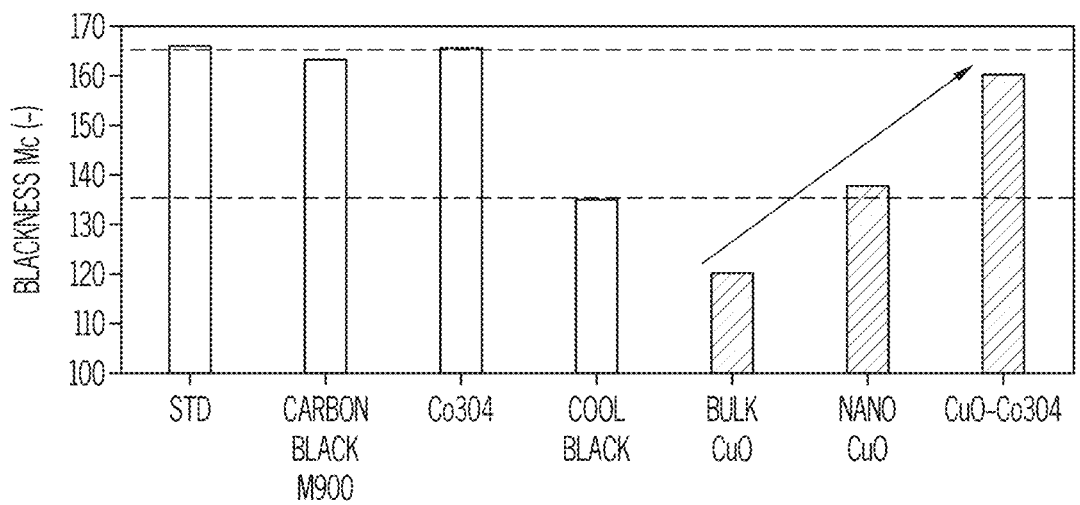
FIG. 4A is a bar graph showing the blackness of various materials including the copper oxide coated cobalt oxide before applying a clear coat according to embodiments disclosed and described herein.

The blackness of an embodiment of copper oxide coated cobalt oxide compared to other materials before applying a clear coat is shown in FIG. 4A. As can be seen in FIG. 4A, the standard (STD), carbon black, and uncoated cobalt oxide ($Co_3O_4$) all have blackness around 165; this is the standard for pigments used in true black applications, such as use paints generally, and particularly in an automotive paint. FIG. 4A shows that the blackness of cool black (a chromium-based pigment commonly used in applications), bulk CuO, and CuO nanoparticles (nano CuO) all fall well short of the standard for pigments used in true black applications. However, copper oxide coated cobalt oxide ($CuO$—$Co_3O_4$) has a blackness that is similar to the standard for pigments used in true black applications, such as use in paints generally, and particularly as an automotive paint.

Figure 4B:
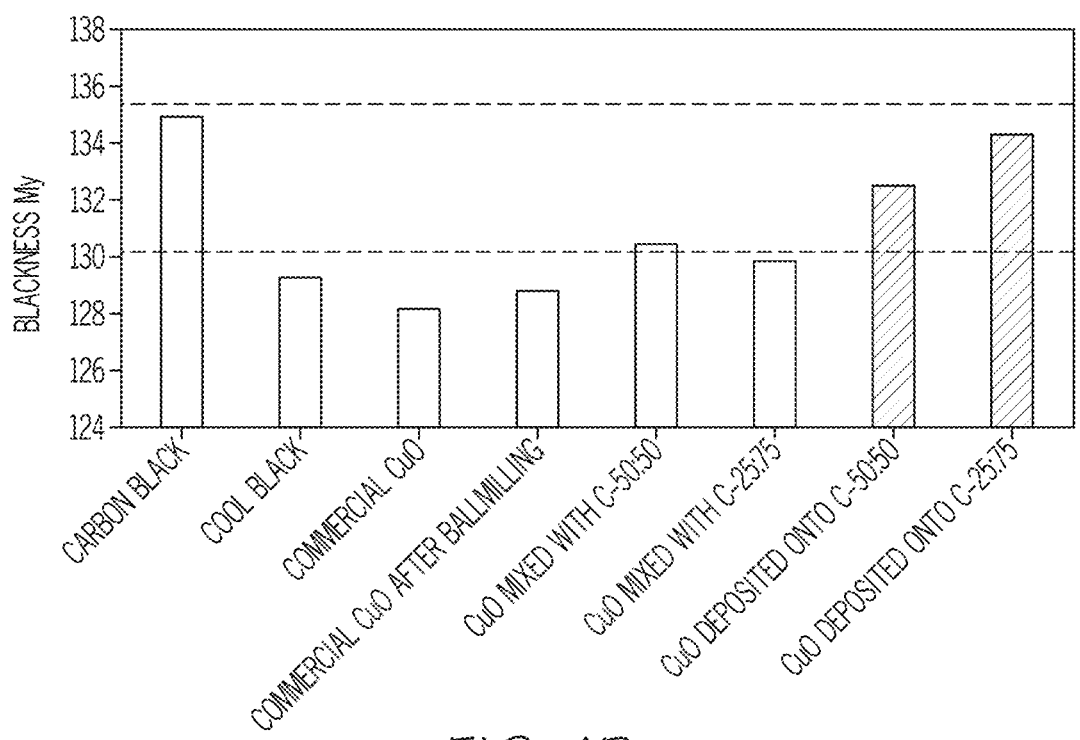
FIG. 4B is a bar graph showing the blackness of various materials including the copper oxide coated carbon black after applying a clear coat according to embodiments disclosed and described herein.

The blackness of an embodiment of copper oxide coated carbon black compared to other materials after applying a clear coat to the sample is shown in FIG. 4B. As can be seen in FIG. 4B, carbon black has a blackness around 135; this is the standard for pigments used in true black applications, such as use paints generally, and particularly in an automotive paint. FIG. 4B shows that the blackness of cool black (a chromium-based pigment commonly used in applications), bulk (commercial) CuO, and CuO nanoparticles (nano CuO), a 50:50 mix of CuO and carbon black, a 25:75 mix of CuO and carbon black all fall well short of the standard for pigments used in true black applications. However, a 50:50 ratio of copper oxide coated carbon black and a 25:75 ratio of copper oxide coated carbon black has a blackness that is similar to the standard for pigments used in true black applications, such as use in paints generally, and particularly as an automotive paint.

Another way to measure the blackness of a particle is by its reflectivity of electromagnetic radiation within the visible spectrum. According to embodiments, copper oxide coated particles 310 have a reflectivity for electromagnetic radiation in the visible spectrum that is less than or equal to 5.0%, as measured via UV-Vis-NIR spectrophotometer, such as less than or equal to 4.5%, less than or equal to 4.0%, less than or equal to 3.5%, less than or equal to 3.0%, less than or equal to 2.5%, less than or equal 2.0%, less than or equal to 1.5%, less than or equal to 1.0%, or less than or equal to 0.5. In one or more embodiments, the copper oxide coated particles have a reflectivity for electromagnetic radiation in the visible spectrum that is greater than or equal to 0.5% and less than or equal to 5.0%, such as greater than or equal to 0.5% and less than or equal to 4.5%, greater than or equal to 0.5% and less than or equal to 4.0%, greater than or equal to 0.5% and less than or equal to 3.5%, greater than or equal to 0.5% and less than or equal to 3.0%, greater than or equal to 0.5% and less than or equal to 2.5%, greater than or equal to 0.5% and less than or equal to 2.0%, greater than or equal to 0.5% and less than or equal to 1.5%, greater than or equal to 0.5% and less than or equal to 1.0%, greater than or equal to 1.0% and less than or equal to 5.0%, greater than or equal to 1.0% and less than or equal to 4.5%, greater than or equal to 1.0% and less than or equal to 4.0%, greater than or equal to 1.0% and less than or equal to 3.5%, greater than or equal to 1.0% and less than or equal to 3.0%, greater than or equal to 1.0% and less than or equal to 2.5%, greater than or equal to 1.0% and less than or equal to 2.0%, greater than or equal to 1.0% and less than or equal to 1.5%, greater than or equal to 1.5% and less than or equal to 5.0%, greater than or equal to 1.5% and less than or equal to 4.5%, greater than or equal to 1.5% and less than or equal to 4.0%, greater than or equal to 1.5% and less than or equal to 3.5%, greater than or equal to 1.5% and less than or equal to 3.0%, greater than or equal to 1.5% and less than or equal to 2.5%, greater than or equal to 1.5% and less than or equal to 2.0%, greater than or equal to 2.0% and less than or equal to 5.0%, greater than or equal to 2.0% and less than or equal to 4.5%, greater than or equal to 2.0% and less than or equal to 4.0%, greater than or equal to 2.0% and less than or equal to 3.5%, greater than or equal to 2.0% and less than or equal to 3.0%, greater than or equal to 2.0% and less than or equal to 2.5%, greater than or equal to 2.5% and less than or equal to 5.0%, greater than or equal to 2.5% and less than or equal to 4.5%, greater than or equal to 2.5% and less than or equal to 4.0%, greater than or equal to 2.5% and less than or equal to 3.5%, greater than or equal to 2.5% and less than or equal to 3.0%, greater than or equal to 3.0% and less than or equal to 5.0%, greater than or equal to 3.0% and less than or equal to 4.5%, greater than or equal to 3.0% and less than or equal to 4.0%, greater than or equal to 3.0% and less than or equal to 3.5%, greater than or equal to 3.5% and less than or equal to 5.0%, greater than or equal to 3.5% and less than or equal to 4.5%, greater than or equal to 3.5% and less than or equal to 4.0%, greater than or equal to 4.0% and less than or equal to 5.0%, greater than or equal to 4.0% and less than or equal to 4.5%, or greater than or equal to 4.5% and less than or equal to 5.0%.

Copper oxide coated particles according to embodiments disclosed and described herein also reflects electromagnetic radiation in the near-IR and LiDAR spectrum, in addition to absorbing electromagnetic radiation in the visible spectrum. According to one or more embodiments, the copper oxide coated particles have a reflectivity for electromagnetic radiation in the near-IR and LiDAR spectrum that is greater than or equal to 5%, such as greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 60%, or greater than or equal to 65%. In one or more embodiments, the copper oxide coated particles have a reflectivity for electromagnetic radiation in the near-IR and LiDAR spectrum that is greater than or equal to 5% and less than or equal to 65%, such as greater than or equal to 5% and less than or equal to 60%, greater than or equal to 5% and less than or equal to 55%, greater than or equal to 5% and less than or equal to 50%, greater than or equal to 5% and less than or equal to 45%, greater than or equal to 5% and less than or equal to 40%, greater than or equal to 5% and less than or equal to 35%, greater than or equal to 5% and less than or equal to 30%, greater than or equal to 5% and less than or equal to 25%, greater than or equal to 5% and less than or equal to 20%, greater than or equal to 5% and less than or equal to 15%, greater than or equal to 5% and less than or equal to 10%. In one or more embodiments, the copper oxide coated particles have a reflectivity for electromagnetic radiation in the near-IR and LiDAR spectrum that is greater than or equal to 10% and less than or equal to 65%, such as greater than or equal to 10% and less than or equal to 60%, greater than or equal to 10% and less than or equal to 55%, greater than or equal to 10% and less than or equal to 50%, greater than or equal to 10% and less than or equal to 45%, greater than or equal to 10% and less than or equal to 40%, greater than or equal to 10% and less than or equal to 35%, greater than or equal to 10% and less than or equal to 30%, greater than or equal to 10% and less than or equal to 25%, greater than or equal to 10% and less than or equal to 20%, or greater than or equal to 10% and less than or equal to 15%.

Methods for forming copper oxide coated cobalt oxide according to embodiments disclosed and described herein will now be described. One method for depositing copper oxide onto cobalt oxide is atomic layer deposition (ALD). ALD is a deposition technique that uses sequential use of gas-phase chemical processes. ALD uses reactions with two chemical precursors that react with the surface of cobalt oxide particles in a sequential, self-limiting manner. Through the repeated exposure to the separate chemical precursors, a film of copper oxide is slowly deposited on the cobalt oxide particles. For instance, the first precursor reacts with reactive sites on the surface of the cobalt oxide particle and excess first precursor is purged from the system. Once the excess first precursor is purged, the second precursor is introduced into the system. The second precursor reacts with the first precursor to form the copper oxide layer on the surface of the cobalt oxide, and excess second precursor is purged from the system. Suitable copper precursors according to embodiments include $Cu(NO_3)_2$, $CuCl_2$, $CuSO_4$, $Cu(CH_3COO)_2$), and combinations thereof.

Although ALD is a technically suitable method for depositing copper oxide on the surface of cobalt oxide, ALD processes are expensive, time consuming, and difficult to scale up to commercially viable levels. Therefore, other methods for depositing copper oxide on cobalt oxide include wet chemistry methods.

A first wet chemistry method that can be used, according to embodiments, begins with a solution of copper nitrate ($Cu(NO_3)_2$) having a concentration from greater than or equal to 0.0001 M and less than or equal to 0.1 M and cobalt oxide ($Co_3O_4$) particles in the solution of $Cu(NO_3)_2$. To that solution, sodium hydroxide (NaOH) at a concentration from greater than or equal to 0.1 M and less then or equal to 1 M is introduced as a precipitating agent. The $Cu(NO_3)_2$ and the NaOH precipitating agent react to form copper hydroxide ($Cu(OH)_2$) and sodium nitrate ($NaNO_3$) precipitates. The $Cu(OH)_2$ and $NaNO_3$ begin to coat the $Co_3O_4$ particles, thereby forming $Cu(OH)_2$ and $NaNO_3$ coated $Co_3O_4$. Some $Cu(OH)_2$ and/or $NaNO_3$ precipitates out of solution. According to embodiments, the mixture is stored at room temperature over night (such as from greater than or equal to eight to less than or equal to fifteen hours). The $NaNO_3$ on the $Co_3O_4$ particle is removed by washing with water, ethanol, or a mixture of water and ethanol. After the water and ethanol wash, the solution was filtered to obtain $Cu(OH_2)$ coated $Co_3O_4$. The $Cu(OH)_2$ coated $Co_3O_4$ is then dried at a temperature greater than or equal to 100° C. and less than or equal to 140° C. for a duration greater than or equal to 0.5 hours and less than or equal to 5.0 hours.

According to embodiments, the $Cu(OH)_2$ coated $Co_3O_4$ is dried at a temperature greater than or equal to 105° C. and less than or equal to 140° C., such as greater than or equal to 110° C. and less than or equal to 140° C., greater than or equal to 115° C. and less than or equal to 140° C., greater than or equal to 120° C. and less than or equal to 140° C., greater than or equal to 125° C. and less than or equal to 140° C., greater than or equal to 130° C. and less than or equal to 140° C., greater than or equal to 135° C. and less than or equal to 140° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 130° C., greater than or equal to 105° C. and less than or equal to 130° C., greater than or equal to 110° C. and less than or equal to 130° C., greater than or equal to 115°

C. and less than or equal to 130° C., greater than or equal to 120° C. and less than or equal to 130° C., greater than or equal to 125° C. and less than or equal to 130° C., greater than or equal to 100° C. and less than or equal to 125° C., greater than or equal to 105° C. and less than or equal to 125° C., greater than or equal to 110° C. and less than or equal to 125° C., greater than or equal to 115° C. and less than or equal to 125° C., greater than or equal to 120° C. and less than or equal to 125° C., greater than or equal to 100° C. and less than or equal to 120° C., greater than or equal to 105° C. and less than or equal to 120° C., greater than or equal to 110° C. and less than or equal to 120° C., greater than or equal to 115° C. and less than or equal to 120° C., greater than or equal to 100° C. and less than or equal to 115° C., greater than or equal to 105° C. and less than or equal to 115° C., greater than or equal to 110° C. and less than or equal to 115° C., greater than or equal to 100° C. and less than or equal to 110° C., greater than or equal to 105° C. and less than or equal to 110° C., or greater than or equal to 100° C. and less than or equal to 105° C.

According to embodiments, the Cu(OH)$_2$ coated Co$_3$O$_4$ is dried for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

The dried Cu(OH)$_2$ coated Co$_3$O$_4$ is, according to embodiments, calcined at a temperature greater than or equal to 430° C. and less than or equal to 470° C. for a duration greater than or equal to 0.5 hours and less than or equal to 5.0 hours.

In one or more embodiments, the dried Cu(OH)$_2$ coated Co$_3$O$_4$ is calcined at a temperature greater than or equal to 435° C. and less than or equal to 470° C., such as greater than or equal to 440° C. and less than or equal to 470° C., greater than or equal to 445° C. and less than or equal to 470° C., greater than or equal to 450° C. and less than or equal to 470° C., greater than or equal to 455° C. and less than or equal to 470° C., greater than or equal to 460° C. and less than or equal to 470° C., greater than or equal to 465° C. and less than or equal to 470° C., greater than or equal to 430° C. and less than or equal to 465° C., greater than or equal to 435° C. and less than or equal to 465° C., greater than or equal to 440° C. and less than or equal to 465° C., greater than or equal to 445° C. and less than or equal to 465° C., greater than or equal to 450° C. and less than or equal to 465° C., greater than or equal to 455° C. and less than or equal to 465° C., greater than or equal to 460° C. and less than or equal to 465° C., greater than or equal to 430° C. and less than or equal to 460° C., greater than or equal to 435° C. and less than or equal to 460° C., greater than or equal to 440° C. and less than or equal to 460° C., greater than or equal to 445° C. and less than or equal to 460° C., greater than or equal to 450° C. and less than or equal to 460° C., greater than or equal to 455° C. and less than or equal to 460° C., greater than or equal to 430° C. and less than or equal to 455° C., greater than or equal to 435° C. and less than or equal to 455° C., greater than or equal to 440° C. and less than or equal to 455° C., greater than or equal to 445° C. and less than or equal to 455° C., greater than or equal to 450° C. and less than or equal to 455° C., greater than or equal to 430° C. and less than or equal to 450° C., greater than or equal to 435° C. and less than or equal to 450° C., greater than or equal to 440° C. and less than or equal to 450° C., greater than or equal to 445° C. and less than or equal to 450° C., greater than or equal to 430° C. and less than or equal to 445° C., greater than or equal to 435° C. and less than or equal to 445° C., greater than or equal to 440° C. and less than or equal to 445° C., greater than or equal to 430° C. and less than or equal to 440° C., greater than or equal to 435° C. and less than or equal to 440° C., or greater than or equal to 430° C. and less than or equal to 435° C.

According to embodiments, the dried Cu(OH)$_2$ coated Co$_3$O$_4$ is calcined for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

After calcination copper oxide (CuO) coated cobalt oxide ($Co_3O_4$) particles were obtained.

A second wet chemistry method that can be used, according to embodiments, begins with a solution of copper nitrate ($Cu(NO_3)_2$) having a concentration that is greater than or equal to 0.0001 M and less than or equal to 0.1 M and cobalt oxide ($Co_3O_4$) particles in the solution of $Cu(NO_3)_2$. To that solution, sodium carbonate ($NaCO_3$) is introduced as a precipitating agent. The $Cu(NO_3)_2$ and the $NaCO_3$ precipitating agent react to form copper carbonate ($CuCO_3$) and sodium nitrate ($NaNO_3$) precipitates. The $CuCO_3$ and $NaNO_3$ begin to coat the $Co_3O_4$ particles, thereby forming $CuCO_3$ and $NaNO_3$ coated $Co_3O_4$. Some $CuCO_3$ and/or $NaNO_3$ precipitates out of solution. According to embodiments, the mixture may be stored at room temperature (such as from greater than or equal to 20° C. and less than or equal to 25° C.) overnight (such as greater than or equal to eight hours and less than or equal to fifteen hours). The $NaNO_3$ on the $Co_3O_4$ particle is removed by washing with water, ethanol, or a mixture of water and ethanol. After the water and ethanol wash, the solution was filtered to obtain $CuCO_3$ coated $Co_3O_4$. The $CuCO_3$ coated $Co_3O_4$ is then dried at a temperature greater than or equal to 100° C. and less than or equal to 140° C. for a duration greater than or equal to 0.5 hours and less than or equal to 5.0 hours.

According to embodiments, the $CuCO_3$ coated $Co_3O_4$ is dried at a temperature greater than or equal to 105° C. and less than or equal to 140° C., such as greater than or equal to 110° C. and less than or equal to 140° C., greater than or equal to 115° C. and less than or equal to 140° C., greater than or equal to 120° C. and less than or equal to 140° C., greater than or equal to 125° C. and less than or equal to 140° C., greater than or equal to 130° C. and less than or equal to 140° C., greater than or equal to 135° C. and less than or equal to 140° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 130° C., greater than or equal to 105° C. and less than or equal to 130° C., greater than or equal to 110° C. and less than or equal to 130° C., greater than or equal to 115° C. and less than or equal to 130° C., greater than or equal to 120° C. and less than or equal to 130° C., greater than or equal to 125° C. and less than or equal to 130° C., greater than or equal to 100° C. and less than or equal to 125° C., greater than or equal to 105° C. and less than or equal to 125° C., greater than or equal to 110° C. and less than or equal to 125° C., greater than or equal to 115° C. and less than or equal to 125° C., greater than or equal to 120° C. and less than or equal to 125° C., greater than or equal to 100° C. and less than or equal to 120° C., greater than or equal to 105° C. and less than or equal to 120° C., greater than or equal to 110° C. and less than or equal to 120° C., greater than or equal to 115° C. and less than or equal to 120° C., greater than or equal to 100° C. and less than or equal to 115° C., greater than or equal to 105° C. and less than or equal to 115° C., greater than or equal to 110° C. and less than or equal to 115° C., greater than or equal to 100° C. and less than or equal to 110° C., or greater than or equal to 100° C. and less than or equal to 105° C.

According to embodiments, the $CuCO_3$ coated $Co_3O_4$ is dried for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

The dried $CuCO_3$ coated $Co_3O_4$ is, according to embodiments, calcined at a temperature greater than or equal to 430° C. and less than or equal to 470° C. for a duration greater than or equal to 0.5 hours and less than or equal to 5.0 hours.

In one or more embodiments, the dried $Cu(OH)_2$ coated $Co_3O_4$ is calcined at a temperature greater than or equal to 435° C. and less than or equal to 470° C., such as greater than or equal to 440° C. and less than or equal to 470° C., greater than or equal to 445° C. and less than or equal to 470° C., greater than or equal to 450° C. and less than or equal to 470° C., greater than or equal to 455° C. and less than or equal to 470° C., greater than or equal to 460° C. and less than or equal to 470° C., greater than or equal to 465° C. and less than or equal to 470° C., greater than or equal to 430° C. and less than or equal to 465° C., greater than or equal to 435° C. and less than or equal to 465° C., greater than or equal to 440° C. and less than or equal to 465° C., greater than or equal to 445° C. and less than or equal to 465° C., greater than or equal to 450° C. and less than or equal to 465° C., greater than or equal to 455° C. and less than or equal to 465° C., greater than or equal to 460° C. and less than or equal to 465° C., greater than or equal to 430° C. and less than or equal to 460° C., greater than or equal to 435° C. and less than or equal to 460° C., greater than or equal to 440° C. and less than or equal to 460° C., greater than or equal to 445° C. and less than or equal to 460° C., greater than or equal to 450° C. and less than or equal to 460° C., greater than or equal to 455° C. and less than or equal to 460° C., greater than or equal to 430° C. and less than or equal to 455° C., greater than or equal to 435° C. and less than or equal to 455° C., greater than or equal to 440° C. and less than or equal to 455° C., greater than or equal to 445° C. and less than or equal to 455° C., greater than or equal to 450° C. and less than or equal to 455° C., greater than or equal to 430° C. and less than or equal to 450° C., greater than or equal to 435° C. and less than or equal to 450° C., greater than or equal to 440° C. and less than or equal to 450° C., greater than or equal to 445° C. and less than or equal to 450° C., greater than or equal to 430° C. and less than or equal to 445° C., greater than or equal to 435° C. and less than or equal to 445° C., greater than or equal to 440° C. and less than or equal to 445° C., greater than or equal to 430° C. and less than or equal to 440° C., greater than or equal to 435° C. and less than or equal to 440° C., or greater than or equal to 430° C. and less than or equal to 435° C.

According to embodiments, the dried $CuCO_3$ coated $Co_3O_4$ is calcined for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

After calcination copper oxide (CuO) coated cobalt oxide ($Co_3O_4$) particles were obtained. According to embodiments, the $Co_3O_4$ particle originally present in the $Cu(NO_3)_2$ solution may be replaced with a cobalt nitrate ($Co(NO_3)_2$) solution. According to one or more embodiments, the ratio of cobalt to copper is greater than or equal to 1:1 and less than or equal to 9:1, such as greater than or equal to 1:1 and less than or equal to 8:1, greater than or equal to 1:1 and less than or equal to 7:1, greater than or equal to 1:1 and less than or equal to 6:1, greater than or equal to 1:1 and less than or equal to 5:1, greater than or equal to 1:1 and less than or equal to 4:1, greater than or equal to 1:1 and less than or equal to 3:1, or greater than or equal to 1:1 and less than or equal to 2:1. According to embodiments, precipitating agents include NaOH, $Na_2CO_3$, $(NH_4)_2CO_3$, and mixtures thereof.

A third wet chemistry method that can be used, according to embodiments, begins with a solution of copper nitrate ($Cu(NO_3)_2$) having a concentration greater than or equal to 0.0001 M and less than or equal to 0.1 M and cobalt oxide ($Co_3O_4$) particles in the solution of $Cu(NO_3)_2$. To that solution, ammonium carbonate (($NH_4)_2CO_3$) is introduced as a precipitating agent. In this wet chemistry method, an ammonium-based precipitating agent is used in place of the sodium-based precipitating agents of the first and second wet chemistry methods. The sodium-based precipitates formed by the sodium-based precipitating agents can interfere with reactions and lower the yield of CuO coated $Co_3O_4$. The $Cu(NO_3)_2$ and the $(NH_4)_2CO_3$ precipitating agent react to form copper carbonate ($CuCO_3$) and ammonium nitrate (($NH_4)_2NO_3$) precipitates. The $CuCO_3$ and $(NH_4)_2NO_3$ begin to coat the $Co_3O_4$ particles, thereby forming $CuCO_3$ and $(NH_4)_2NO_3$ coated $Co_3O_4$. Some $CuCO_3$ and/or $(NH_4)_2NO_3$ precipitates out of solution. According to embodiments, the mixture may be stored at room temperature (such as from greater than or equal to 20° C. and less than or equal to 25° C.) overnight (such as greater than or equal to eight hours and less than or equal to fifteen hours). The $(NH_4)_2NO_3$ on the $Co_3O_4$ particle is removed by washing with water, ethanol, or a mixture of water and ethanol. After the water and ethanol wash, the solution was filtered to obtain $CuCO_3$ coated $Co_3O_4$. The $CuCO_3$ coated $Co_3O_4$ is then dried at a temperature greater than or equal to 100° C. and less than or equal to 140° C. for a duration greater than or equal to 0.5 hours and less than or equal to 5.0 hours.

According to embodiments, the $CuCO_3$ coated $Co_3O_4$ is dried at a temperature greater than or equal to 105° C. and less than or equal to 140° C., such as greater than or equal to 110° C. and less than or equal to 140° C., greater than or equal to 115° C. and less than or equal to 140° C., greater than or equal to 120° C. and less than or equal to 140° C., greater than or equal to 125° C. and less than or equal to 140° C., greater than or equal to 130° C. and less than or equal to 140° C., greater than or equal to 135° C. and less than or equal to 140° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 130° C., greater than or equal to 105° C. and less than or equal to 130° C., greater than or equal to 110° C. and less than or equal to 130° C., greater than or equal to 115° C. and less than or equal to 130° C., greater than or equal to 120° C. and less than or equal to 130° C., greater than or equal to 125° C. and less than or equal to 130° C., greater than or equal to 100° C. and less than or equal to 125° C., greater than or equal to 105° C. and less than or equal to 125° C., greater than or equal to 110° C. and less than or equal to 125° C., greater than or equal to 115° C. and less than or equal to 125° C., greater than or equal to 120° C. and less than or equal to 125° C., greater than or equal to 100° C. and less than or equal to 120° C., greater than or equal to 105° C. and less than or equal to 120° C., greater than or equal to 110° C. and less than or equal to 120° C., greater than or equal to 115° C. and less than or equal to 120° C., greater than or equal to 100° C. and less than or equal to 115° C., greater than or equal to 105° C. and less than or equal to 115° C., greater than or equal to 110° C. and less than or equal to 115° C., greater than or equal to 100° C. and less than or equal to 110° C., greater than or equal to 105° C. and less than or equal to 110° C., or greater than or equal to 100° C. and less than or equal to 105° C.

According to embodiments, the $CuCO_3$ coated $Co_3O_4$ is dried for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

The dried $CuCO_3$ coated $Co_3O_4$ is, according to embodiments, calcined at a temperature greater than or equal to 430° C. and less than or equal to 470° C. for a duration greater than or equal to 0.5 hours and less than or equal to 5.0 hours.

In one or more embodiments, the dried $Cu(OH)_2$ coated $Co_3O_4$ is calcined at a temperature greater than or equal to 435° C. and less than or equal to 470° C., such as greater than or equal to 440° C. and less than or equal to 470° C., greater than or equal to 445° C. and less than or equal to 470° C., greater than or equal to 450° C. and less than or equal to 470° C., greater than or equal to 455° C. and less than or equal to 470° C., greater than or equal to 460° C. and less than or equal to 470° C., greater than or equal to 465° C. and less than or equal to 470° C., greater than or equal to 430° C. and less than or equal to 465° C., greater than or equal to 435° C. and less than or equal to 465° C., greater than or equal to 440° C. and less than or equal to 465° C., greater than or equal to 445° C. and less than or equal to 465° C., greater than or equal to 450° C. and less than or equal to 465° C., greater than or equal to 455° C. and less than or equal to 465° C., greater than or equal to 460° C. and less than or equal to 465° C., greater than or equal to 430° C. and less than or equal to 460° C., greater than or equal to 435° C. and less than or equal to 460° C., greater than or equal to 440° C. and less than or equal to 460° C., greater than or equal to 445° C. and less than or equal to 460° C., greater than or equal to 450° C. and less than or equal to 460° C., greater than or equal to 455° C. and less than or equal to 460° C., greater than or equal to 430° C. and less than or equal to 455° C., greater than or equal to 435° C. and less than or equal to 455° C., greater than or equal to 440° C. and less than or equal to 455° C., greater than or equal to 445° C. and less than or equal to 455° C., greater than or equal to 450° C. and less than or equal to 455° C., greater than or equal to 430° C. and less than or equal to 450° C., greater than or equal to 435° C. and less than or equal to 450° C., greater than or equal to 440° C. and less than or equal to 450° C., greater than or equal to 445° C. and less than or equal to 450° C., greater than or equal to 430° C. and less than or equal to 445° C., greater than or equal to 435° C. and less than or equal to 445° C., greater than or equal to 440° C. and less than or equal to 445° C., greater than or equal to 430° C. and less than or equal to 440° C., greater than or equal to 435° C. and less than or equal to 440° C., or greater than or equal to 430° C. and less than or equal to 435° C.

According to embodiments, the dried $CuCO_3$ coated $Co_3O_4$ is calcined for a duration of greater than or equal to 1.0 hours and less than or equal to 5.0 hours, such as greater than or equal to 1.5 hours and less than or equal to 5.0 hours, greater than or equal to 2.0 hours and less than or equal to 5.0 hours, greater than or equal to 2.5 hours and less than or equal to 5.0 hours, greater than or equal to 3.0 hours and less than or equal to 5.0 hours, greater than or equal to 3.5 hours and less than or equal to 5.0 hours, greater than or equal to 4.0 hours and less than or equal to 5.0 hours, greater than or equal to 4.5 hours and less than or equal to 5.0 hours, greater than or equal to 0.5 hours and less than or equal to 4.5 hours, greater than or equal to 1.0 hours and less than or equal to 4.5 hours, greater than or equal to 1.5 hours and less than or equal to 4.5 hours, greater than or equal to 2.0 hours and less than or equal to 4.5 hours, greater than or equal to 2.5 hours and less than or equal to 4.5 hours, greater than or equal to 3.0 hours and less than or equal to 4.5 hours, greater than or equal to 3.5 hours and less than or equal to 4.5 hours, greater than or equal to 4.0 hours and less than or equal to 4.5 hours, greater than or equal to 0.5 hours and less than or equal to 4.0 hours, greater than or equal to 1.0 hours and less than or equal to 4.0 hours, greater than or equal to 1.5 hours and less than or equal to 4.0 hours, greater than or equal to 2.0 hours and less than or equal to 4.0 hours, greater than or equal to 2.5 hours and less than or equal to 4.0 hours, greater than or equal to 3.0 hours and less than or equal to 4.0 hours, greater than or equal to 3.5 hours and less than or equal to 4.0 hours, greater than or equal to 0.5 hours and less than or equal to 3.5 hours, greater than or equal to 1.0 hours and less than or equal to 3.5 hours, greater than or equal to 1.5 hours and less than or equal to 3.5 hours, greater than or equal to 2.0 hours and less than or equal to 3.5 hours, greater than or equal to 2.5 hours and less than or equal to 3.5 hours, greater than or equal to 3.0 hours and less than or equal to 3.5 hours, greater than or equal to 0.5 hours and less than or equal to 3.0 hours, greater than or equal to 1.0 hours and less than or equal to 3.0 hours, greater than or equal to 1.5 hours and less than or equal to 3.0 hours, greater than or equal to 2.0 hours and less than or equal to 3.0 hours, greater than or equal to 2.5 hours and less than or equal to 3.0 hours, greater than or equal to 0.5 hours and less than or equal to 2.5 hours, greater than or equal to 1.0 hours and less than or equal to 2.5 hours, greater than or equal to 1.5 hours and less than or equal to 2.5 hours, greater than or equal to 2.0 hours and less than or equal to 2.5 hours, greater than or equal to 0.5 hours and less than or equal to 2.0 hours, greater than or equal to 1.0 hours and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, greater than or equal to 0.5 hours and less than or equal to 1.0 hours.

After calcination copper oxide (CuO) coated cobalt oxide ($Co_3O_4$) particles were obtained.

Methods for forming copper oxide (CuO) coated carbon black particles will now be described.

A thin layer of CuO can be applied to the surface of carbon black by ALD similar to the method described above for depositing CuO on $Co_3O_4$ described above, but by using the precursors disclosed above to deposit the CuO onto a carbon black particle.

As disclosed above, although ALD is a technically suitable method for depositing copper oxide on the surface of carbon black, ALD processes are expensive, time consuming, and difficult to scale up to commercially viable levels. Therefore, other methods for depositing copper oxide on carbon black include wet chemistry methods.

A wet chemistry method that can be used, according to embodiments, begins with a solution of copper nitrate ($Cu(NO_3)_2$) having a concentration greater than or equal to 0.0001 M and less than or equal to 0.1 M and carbon black particles in the solution of $Cu(NO_3)_2$. To that solution, $NaCO_3$, $(NH_4)_2CO_3$, or NaOH is introduced as a precipitating agent. Certain ratios of $Cu(NO_3)_2$ and the precipitating agent will react to form $Cu(OH)_2$ or $CuCO_3$ (depending on the precipitating agent) and $NaNO_3$ or $(NH_4)_2NO_3$ precipitates (depending on the precipitating agent). The ($Cu(OH)_2$) and/or $CuCO_3$ coats the carbon black particles. Then the $NaNO_3$ and/or $(NH_4)_2NO_3$ is removed by washing the precipitate with water and ethanol. The solution can then be filtered to obtain $Cu((OH)_2$ coated carbon black or $CuCO_3$ coated carbon black. Then, the precipitate is dried at a temperature greater than or equal to 100° C. and less than or equal to 140° C. for a duration from greater than or equal to 5 hours and less than or equal to 15 hours.

According to embodiments, the $CuCO_3$ and/or $Cu(OH)_2$ coated carbon black is dried at a temperature greater than or equal to 105° C. and less than or equal to 140° C., such as greater than or equal to 110° C. and less than or equal to 140° C., greater than or equal to 115° C. and less than or equal to 140° C., greater than or equal to 120° C. and less than or equal to 140° C., greater than or equal to 125° C. and less than or equal to 140° C., greater than or equal to 130° C. and less than or equal to 140° C., greater than or equal to 135° C. and less than or equal to 140° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 135° C., greater than or equal to 105° C. and less than or equal to 135° C., greater than or equal to 110° C. and less than or equal to 135° C., greater than or equal to 115° C. and less than or equal to 135° C., greater than or equal to 120° C. and less than or equal to 135° C., greater than or equal to 125° C. and less than or equal to 135° C., greater than or equal to 130° C. and less than or equal to 135° C., greater than or equal to 100° C. and less than or equal to 130° C., greater than or equal to 105° C. and less than or equal to 130° C., greater than or equal to 110° C. and less than or equal to 130° C., greater than or equal to 115° C. and less than or equal to 130° C., greater than or equal to 120° C. and less than or equal to 130° C., greater than or equal to 125° C. and less than or equal to 130° C., greater than or equal to 100° C. and less than or equal to 125° C., greater than or equal to 105° C. and less than or equal to 125° C., greater than or equal to 110° C. and less than or equal to 125° C., greater than or equal to 115° C. and less than or equal to 125° C., greater than or equal to 120° C. and less than or equal to 125° C., greater than or equal to 100° C. and less than or equal to 120° C., greater than or equal to 105° C. and less than or equal to 120° C., greater than or equal to 110° C. and less than or equal to 120° C., greater than or equal to 115° C. and less than or equal to 120° C., greater than or equal to 100° C. and less than or equal to 115° C., greater than or equal to 105° C. and less than or equal to 115° C., greater than or equal to 110° C. and less than or equal to 115° C., greater than or equal to 100° C. and less than or equal to 110° C., greater than or equal to 105° C. and less than or equal to 110° C., or greater than or equal to 100° C. and less than or equal to 105° C.

According to embodiments, the $CuCO_3$ and/or $Cu(OH)_2$ coated carbon black is dried for a duration greater than or equal to 6 hours and less than or equal to 15 hours, greater than or equal to 7 hours and less than or equal to 15 hours, such as greater than or equal to 8 hours and less than or equal to 15 hours, greater than or equal to 9 hours and less than or equal to 15 hours, greater than or equal to 10 hours and less than or equal to 15 hours, greater than or equal to 11 hours and less than or equal to 15 hours, greater than or equal to 12 hours and less than or equal to 15 hours, greater than or equal to 13 hours and less than or equal to 15 hours, greater than or equal to 14 hours and less than or equal to 15 hours, greater than or equal to 5 hours and less than or equal to 14 hours, greater than or equal to 6 hours and less than or equal to 14 hours, greater than or equal to 7 hours and less than or equal to 14 hours, greater than or equal to 8 hours and less than or equal to 14 hours, greater than or equal to 9 hours and less than or equal to 14 hours, greater than or equal to 10 hours and less than or equal to 14 hours, greater than or equal to 11 hours and less than or equal to 14 hours, greater than or equal to 12 hours and less than or equal to 14 hours, greater than or equal to 13 hours and less than or equal to 14 hours, greater than or equal to 5 hours and less than or equal to 13 hours, greater than or equal to 6 hours and less than or equal to 13 hours, greater than or equal to 7 hours and less than or equal to 13 hours, greater than or equal to 8 hours and less than or equal to 13 hours, greater than or equal to 9 hours and less than or equal to 13 hours, greater than or equal to 10 hours and less than or equal to 13 hours, greater than or equal to 11 hours and less than or equal to 13 hours, greater than or equal to 12 hours and less than or equal to 13 hours, greater than or equal to 5 hours and less than or equal to 12 hours, greater than or equal to 6 hours and less than or equal to 12 hours, greater than or equal to 7 hours and less than or equal to 12 hours, greater than or equal to 8 hours and less than or equal to 12 hours, greater than or equal to 9 hours and less than or equal to 12 hours, greater than or equal to 10 hours and less than or equal to 12 hours, greater than or equal to 11 hours and less than or equal to 12 hours, greater than or equal to 5 hours and less than or equal to 11 hours, greater than or equal to 6 hours and less than or equal to 11 hours, greater than or equal to 7 hours and less than or equal to 11 hours, greater than or equal to 8 hours and less than or equal to 11 hours, greater than or equal to 9 hours and less than or equal to 11 hours, greater than or equal to 10 hours and less than or equal to 11 hours, greater than or equal to 5 hours and less than or equal to 10 hours, greater than or equal to 6 hours and less than or equal to 10 hours, greater than or equal to 7 hours and less than or equal to 10 hours, greater than or equal to 8 hours and less than or equal to 10 hours, greater than or equal to 9 hours and less than or equal to 10 hours, greater than or equal to 5 hours and less than or equal to 9 hours, greater than or equal to 6 hours and less than or equal to 9 hours, greater than or equal to 7 hours and less than or equal to 9 hours, greater than or equal to 8 hours and less than or equal to 9 hours, greater than or equal to 5 hours and less than or equal to 8 hours, greater than or equal to 6 hours and less than or equal to 8 hours, greater than or equal to 7 hours and less than or equal to 8 hours, greater than or equal to 5 hours and less than or equal to 7 hours, greater than or equal to 6 hours and less than or equal to 7 hours, or greater than or equal to 5 hours and less than or equal to 6 hours.

The dried $CuCO_3$ and/or $Cu(OH)_2$ coated carbon black is, according to embodiments, calcined at a temperature greater than or equal to 200° C. and less than or equal to 300° C. for a duration greater than or equal to 0.5 hours and less than or equal to 5.0 hours. From this calcination, CuO coated carbon black is obtained.

In one or more embodiments, the dried $CuCO_3$ and/or $Cu(OH)_2$ coated carbon black is calcined at a temperature greater than or equal to 210° C. and less than or equal to 300° C., such as greater than or equal to 220° C. and less than or equal to 300° C., greater than or equal to 230° C. and less than or equal to 300° C., greater than or equal to 240° C. and less than or equal to 300° C., greater than or equal to 250° C. and less than or equal to 300° C., greater than or equal to 260° C. and less than or equal to 300° C., greater than or equal to 270° C. and less than or equal to 300° C., greater than or equal to 280° C. and less than or equal to 300° C., greater than or equal to 290° C. and less than or equal to 300° C., greater than or equal to 200° C. and less than or equal to 290° C., greater than or equal to 210° C. and less than or equal to 290° C., greater than or equal to 220° C. and less than or equal to 290° C., greater than or equal to 230° C. and less than or equal to 290° C., greater than or equal to 240° C. and less than or equal to 290° C., greater than or equal to 250° C. and less than or equal to 290° C., greater than or equal to 260° C. and less than or equal to 290° C., greater than or equal to 270° C. and less than or equal to 290° C., greater than or equal to 280° C. and less than or equal to 290° C., greater than or equal to 200° C. and less than or equal to 280° C., greater than or equal to 210° C. and less than or equal to 280° C., greater than or equal to 220° C. and less than or equal to 280° C., greater than or equal to 230° C. and less than or equal to 280° C., greater than or equal to 240° C. and less than or equal to 280° C., greater than or equal to 250° C. and less than or equal to 280° C., greater than or equal to 260° C. and less than or equal to 280° C., greater than or equal to 270° C. and less than or equal to 280° C., greater than or equal to 200° C. and less than or equal to 270° C., greater than or equal to 210° C. and less than or equal to 270° C., greater than or equal to 220° C. and less than or equal to 270° C., greater than or equal to 230° C. and less than or equal to 270° C., greater than or equal to 240° C. and less than or equal to 270° C., greater than or equal to 250° C. and less than or equal to 270° C., greater than or equal to 260° C. and less than or equal to 270° C., greater than or equal to 200° C. and less than or equal to 260° C., greater than or equal to 210° C. and less than or equal to 260° C., greater than or equal to 220° C. and less than or equal to 260° C., greater than or equal to 230° C. and less than or equal to 260° C., greater than or equal to 240° C. and less than or equal to 260° C., greater than or equal to 250° C. and less than or equal to 260° C., greater than or equal to 200° C. and less than or equal to 250° C., greater than or equal to 210° C. and less than or equal to 250° C., greater than or equal to 220° C. and less than or equal to 250° C., greater than or equal to 230° C. and less than or equal to 250° C., greater than or equal to 240° C. and less than or equal to 250° C., greater than or equal to 200° C. and less than or equal to 240° C., greater than or equal to 210° C. and less than or equal to 240° C., greater than or equal to 220° C. and less than or equal to 240° C., greater than or equal to 230° C. and less than or equal to 240° C., greater than or equal to 200° C. and less than or equal to 230° C., greater than or equal to 210° C. and less than or equal to 230° C., greater than or equal to 220° C. and less than or equal to 230° C., greater than or equal to 200° C. and less than or equal to 220° C., greater than or equal to 210° C. and less than or equal to 220° C., or greater than or equal to 200° C. and less than or equal to 210° C.

Using the above-disclosed method, carbon black coated with scattering CuO nanoparticles can be formed. Although either one or a combination of $NaCO_3$, NaOH, or $(NH_4)_2CO_3$ can be used in the process, $(NH_4)_2CO_3$ typically provides better yields.

Referring again to FIG. 3, an embodiment of a copper oxide coated particle system 300 where the particles can be copper oxide coated cobalt oxide or copper oxide coated carbon black will be further described. According to embodiments, the copper oxide coated particle system 300 may be a paint layer with a plurality of copper oxide coated particles 310 in a carrier 330. According to embodiments disclosed and described herein, the carrier 330 may be a binder or any type of solvent for a paint system, such as organic solvents or water. Non-limiting examples of binders including enamel paint binders, urethane paint binders, combination enamel-urethane paint binders, acrylic binders, latex binders, and the like. The copper oxide coated particle system 300 can, in embodiments, appear as a dark color to an observer viewing the copper oxide coated particle system 300 and reflects electromagnetic radiation in the near-IR and LiDAR spectrum, such as, for example, electromagnetic radiation with a wavelength from greater than about 750 nm to 1550 nm. That is, the near-IR and LiDAR reflecting copper oxide coated particle system 300, when exposed to sunlight and viewed by an observer, has a color with a lightness in CIELAB color space of less than or equal to 20 and reflects an average of more than 20% of electromagnetic radiation in the near-IR and LiDAR spectrum, such as electromagnetic radiation with a wavelength from greater than about 750 nm to 1550 nm. In embodiments, the near-IR and LiDAR reflecting copper oxide coated particle system 300 when exposed to sunlight reflects an average of less than 10% of electromagnetic radiation in the visible spectrum and has a lightness in CIELAB color space of less than or equal to 15. In such embodiments, the near-IR and LiDAR reflecting copper oxide coated particle system 300 when exposed to sunlight may have a lightness in CIELAB color space of less than or equal to 10. As used herein, the term "average" refers to an average of ten (10) reflectance values equally distanced apart along a specified reflectance spectrum for a near-IR and LiDAR reflecting dark colored pigment or near-IR and LiDAR reflecting copper oxide coated particle system 300 described herein. Also, the terms "reflects more than" and "reflects less than" as used herein refers to "reflects an average of more than" and "reflects an average or less than", respectively, unless otherwise stated.

However, in one or more embodiments, the copper oxide coated particles 310 may be one of a number of different types of pigments and/or colorants in the carrier 330 of the copper oxide coated particle system 300. For instance, the copper oxide coated particles 310 disclosed and described herein may be used in combination with other types of pigments and/or colorants added to a carrier to make the copper oxide coated particle system darker. As a non-limiting example, the copper oxide coated particles 310 may be added with conventional green pigments to a carrier 330 to make a dark green copper oxide coated particle system 300. The copper oxide coated particles 310 in the dark green copper oxide coated particle system 300 will reflect a sufficient amount of near-IR or LiDAR electromagnetic radiation so that the dark green copper oxide coated particle system 300 is detectable by a near-IR or LiDAR sensor. Copper oxide coated particles according to embodiments disclosed and described herein can be used in any paint system to darken the visual presentation of the paint system. Accordingly, the copper oxide coated particles disclosed and described herein may be used wherever black pigment-such as carbon black, cobalt oxide, and copper oxide, and the like are used in paint or coloring systems without limitation.

Figure 6:
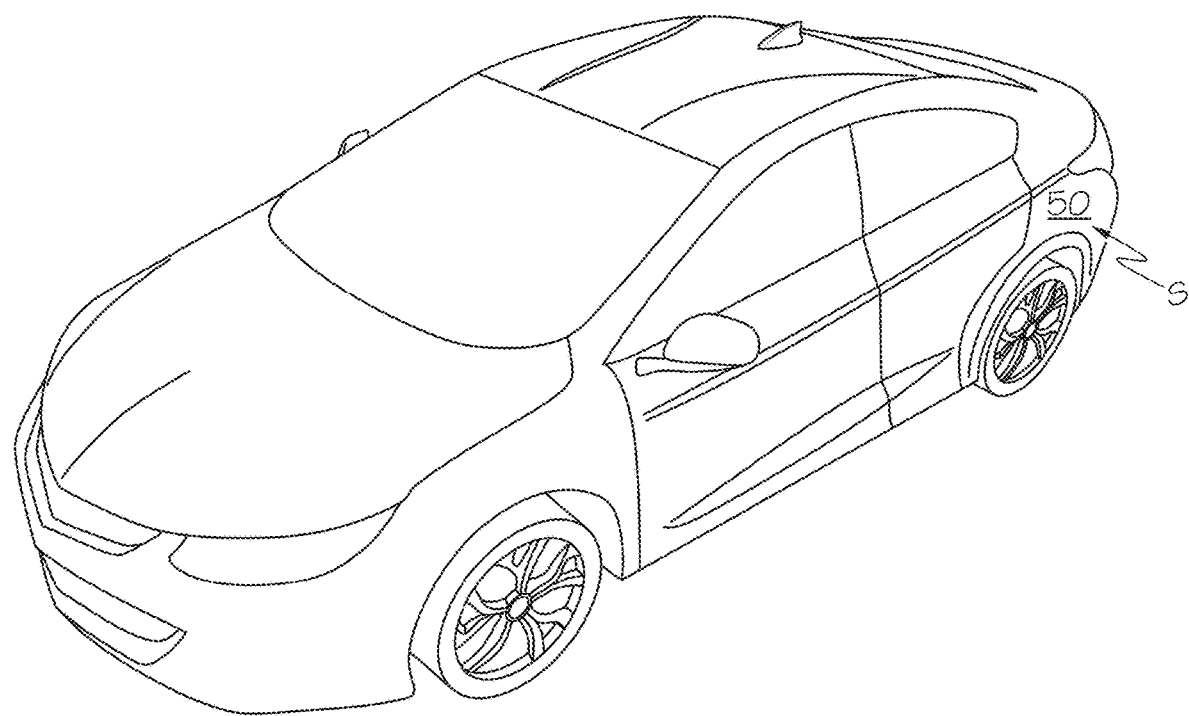
FIG. 6 schematically depicts a vehicle with side panels painted with a LiDAR reflecting dark colored paint according to one or more embodiments disclosed and described herein.
Figure 7:
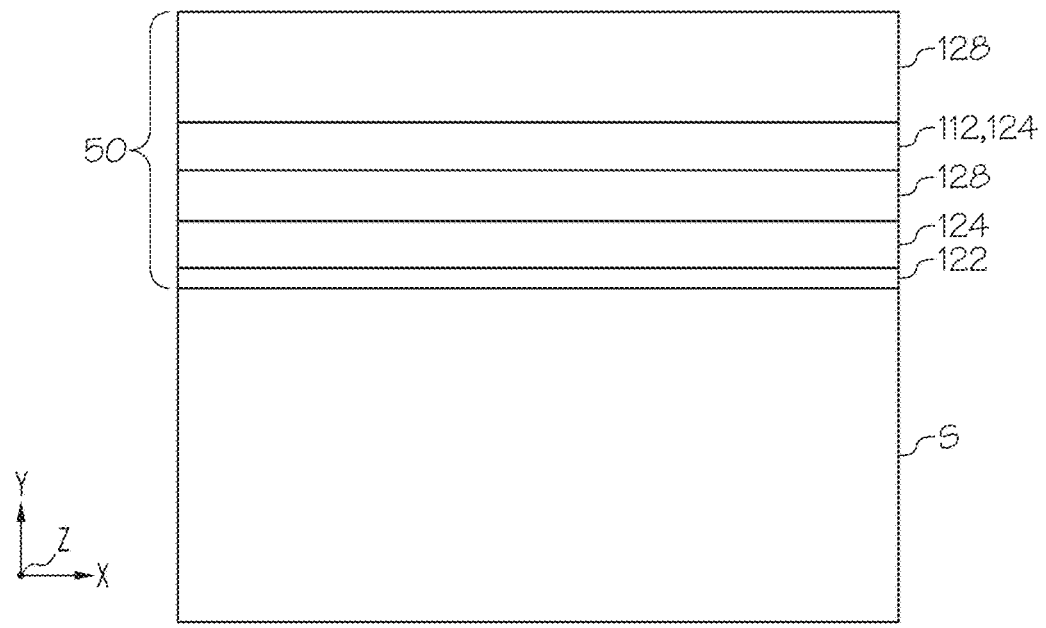
FIG. 7 schematically depicts a cross sectional view of a side panel painted with the LiDAR reflecting dark colored paint in FIG. 5.

Referring now to FIGS. 6 and 7, embodiments of a vehicle 'V' painted with a near-IR and LiDAR reflecting dark colored paint having the copper oxide coated particles disclosed and described herein are depicted. Particularly, FIG. 6 depicts the vehicle V with a side panel 'S' coated with a near-IR and LiDAR reflecting dark colored paint 50 comprising the copper oxide coated particles disclosed and described herein, and FIG. 7 depicts a cross section of one of the side panel S with the near-IR and LiDAR reflecting dark colored paint 50. The near-IR and LiDAR reflecting dark colored paint 50 may include a plurality of layers that provide surface protection and a desired color. For example, the near-IR and LiDAR reflecting dark colored paint 50 may include a phosphate layer 122, an electrocoating layer 124, a primer layer 126, a color layer 112 or a color layer 114 (also known as a basecoat or basecoat layer) and a clear coat layer 128. Non-limiting examples of a phosphate layer include a manganese phosphate layer, an iron phosphate layer, a zinc phosphate layer, and combinations thereof. Non-limiting examples of an electrocoating layer include an anodic electrocoating layer and a cathodic electrocoating layer. Non-limiting examples of a primer layer include an epoxy primer layer and a urethane primer layer. Non-limiting examples of a clear coat layer include a urethane clear coat layer and an acrylic lacquer clear coat layer. It should be understood that the near-IR and LiDAR reflecting dark colored paint 50 appears as a dark color to an observer viewing the near-IR and LiDAR reflecting dark paint and reflects electromagnetic radiation in the near-IR and LiDAR spectrum, such as electromagnetic radiation with a wavelength of from greater than about 750 nm to 1550 nm. That is, the near-IR and LiDAR reflecting dark colored paint 50 exposed to sunlight and viewed by an observer has a color with lightness in CIELAB color space of less than or equal to 20 and reflects more than 40% of electromagnetic radiation in the near-IR and LiDAR spectrum, such as electromagnetic radiation with a wavelength from greater than about 750 nm to 1550 nm. In some embodiments, the near-IR and LiDAR reflecting dark colored paint 50 exposed to sunlight reflects an average of less than 10% of electromagnetic radiation in the visible spectrum and has a lightness in CIELAB color space of less than or equal to 15. In such embodiments, the LiDAR reflecting dark colored paint 50 exposed to sunlight may have a lightness in CIELAB color space of less than or equal to 10.

The blackness of a paint system having a clear coat may be lower than the blackness of the pigment itself. Without being bound by any particular theory, it is believed that less light scattering from the smooth surface of the clear coat, or the less contrast in refractive index caused by the clear coat results in the lower blackness value. According to embodiments, a near-IR and LiDAR reflecting dark colored paint having the copper oxide coated particles has a blackness greater than or equal to 100 and less than or equal to 140, such as greater than or equal to 105 and less than or equal to 140, greater than or equal to 110 and less than or equal to 140, greater than or equal to 115 and less than or equal to 140, greater than or equal to 120 and less than or equal to 140, greater than or equal to 125 and less than or equal to 140, greater than or equal to 130 and less than or equal to 140, greater than or equal to 135 and less than or equal to 140, greater than or equal to 100 and less than or equal to 135, such as greater than or equal to 105 and less than or equal to 135, greater than or equal to 110 and less than or equal to 135, greater than or equal to 115 and less than or equal to 135, greater than or equal to 120 and less than or equal to 135, greater than or equal to 125 and less than or equal to 135, greater than or equal to 130 and less than or equal to 135, greater than or equal to 100 and less than or equal to 130, such as greater than or equal to 105 and less than or equal to 130, greater than or equal to 110 and less than or equal to 130, greater than or equal to 115 and less than or equal to 130, greater than or equal to 120 and less than or equal to 130, greater than or equal to 125 and less than or equal to 130, greater than or equal to 100 and less than or equal to 125, such as greater than or equal to 105 and less than or equal to 125, greater than or equal to 110 and less than or equal to 125, greater than or equal to 115 and less than or equal to 125, greater than or equal to 120 and less than or equal to 125, greater than or equal to 100 and less than or equal to 120, such as greater than or equal to 105 and less than or equal to 120, greater than or equal to 110 and less than or equal to 120, greater than or equal to 115 and less than or equal to 120, greater than or equal to 100 and less than or equal to 115, such as greater than or equal to 105 and less than or equal to 115, greater than or equal to 110 and less than or equal to 115, greater than or equal to 100 and less than or equal to 110, such as greater than or equal to 105 and less than or equal to 110, or greater than or equal to 100 and less than or equal to 105.

As noted above near-IR and LiDAR reflecting copper oxide coated particles according to embodiments disclosed and described herein may be used in paint to provide near-IR and LiDAR reflecting dark-colored articles that can be detected with systems that detect near-IR or LiDAR electromagnetic radiation. Articles that may be painted with near-IR and LiDAR reflecting paint according to embodiments disclosed and described herein are not limited. Objects such as automobiles, motorcycles, bicycles, buildings, doorways, road lines, signs, items in factories, shipyards, warehouses, and the like, may be painted with a near-IR and LiDAR reflecting dark colored paint described herein and thereby provide a dark colored article with a desired dark color and yet be detectable by system that detects electromagnetic radiation in the near-IR and LiDAR spectrum, such as electromagnetic radiation with a wavelength from greater than about 750 nm to 1550 nm.

EXAMPLES

Embodiments will be further clarified by the following examples.

Example 1—Copper Oxide Coated Cobalt Oxide Pigment Synthesis

The following example shows the synthesis of $CuO/Co_3O_4$ with a 1:1 ratio i.e. 50% of CuO and 50% $Co_3O_4$ using $Na_2CO_3$ as a precipitating agent. In a typical synthesis method, 14.6 grams of $Cu(NO_3)_2$ was dissolved in 300 ml of water. Then 5 grams of $Co_3O_4$ was dispersed in the $Cu(NO_3)_2$ solution. In another vessel, 10 grams of $Na_2CO_3$ was dissolved in 300 ml of water. Then, the $Na_2CO_3$ solution was slowly added to the $Cu(NO_3)_2/Co_3O_4$ solution until the precipitation of $Cu(NO_3)_2$ to $CuCO_3$ was completed. The precipitate was then aged overnight and filtered. Subsequently, the precipitate was washed with 1000 ml water and dried at 120° C. for 12 hours at 2° C./min ramp rate. Finally, the material was calcined at 500° C. for 1 hour at 5° C./min ramp rate.

Figure 5:
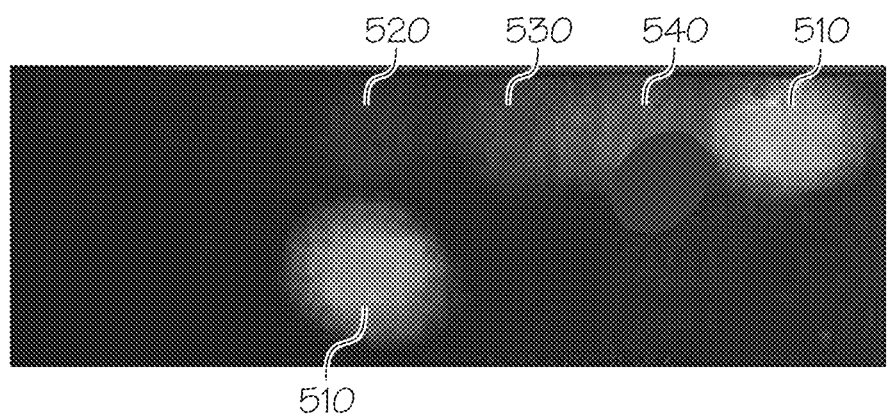
FIG. 5 is an image taken with an IR detecting camera showing reflection of electromagnetic radiation in the near-IR and LiDAR spectrum of copper oxide coated cobalt oxide according to embodiments disclosed and described herein.

The above process was repeated at copper oxide concentrations of 23 wt. % and 33 wt. %. FIG. 5 is a photograph of copper oxide coated cobalt oxide particles having varying percentages of copper oxide on the cobalt oxide taken with an IR camera equipped with SOLOMARK Digital Night Vision Binoculars. FIG. 5 shows increasing reflectance of electromagnetic radiation in the near-IR and LiDAR spectrum as the weight percent of copper oxide in the copper oxide coated cobalt oxide increases. The greatest reflectance shown in FIG. 5 is for 100% copper oxide (two groupings numbered 510 in FIG. 5). However, FIG. 5 shows significant reflectance of copper oxide coated cobalt oxide particles as disclosed hereinabove. In particular, FIG. 5 shows reflectance of electromagnetic radiation in the near-IR and LiDAR spectrum for copper oxide coated cobalt oxide particles comprising 23 wt. % copper oxide (520), 33 wt. % copper oxide (530), and 50 wt. % copper oxide (540).

The blackness of the copper oxide coated cobalt oxide having 50 wt. % copper oxide is shown in FIG. 4 (CuO—Co3O4 bar) as was measured by X-rite Ci7600. The blackness was measured to be about 160 Mc.

Example 2—Copper Oxide Coated Cobalt Oxide Paint System

Three inch by five inch aluminum panels coated with black and white coating were obtained, and an 8-path wet film applicator from Paul N. Gardner Company, Inc. (Pompano Beach, FL) was used to apply a paint system to the panels.

Figure 8:
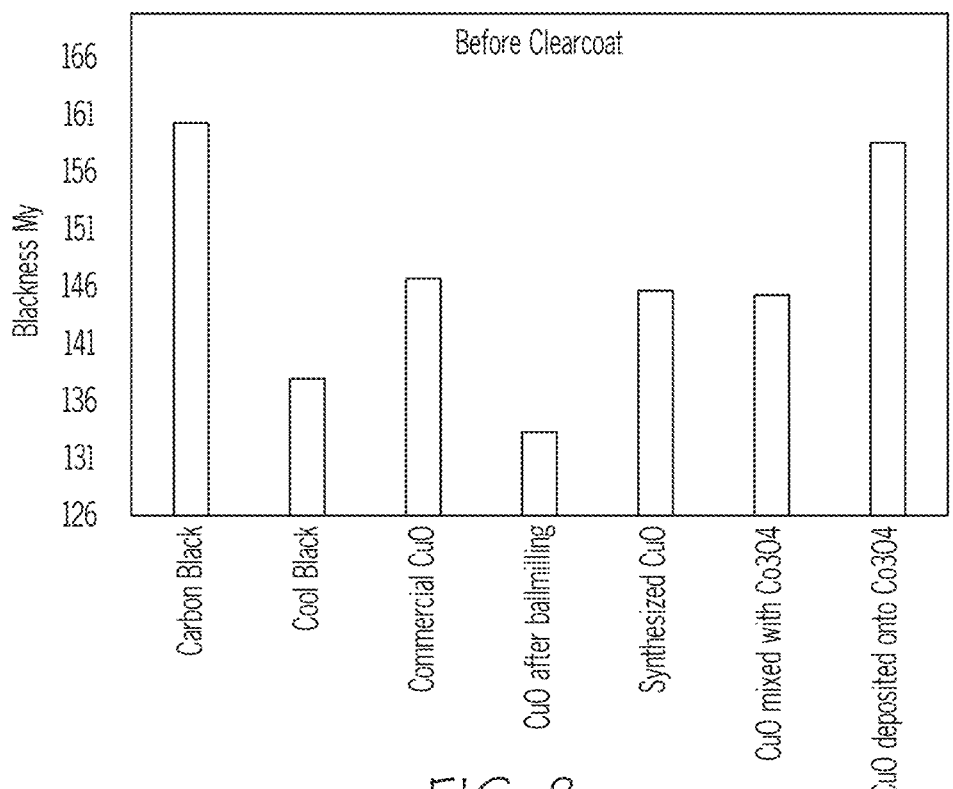
FIG. 8 is a bar graph showing blackness of panels with various pigments before applying a clear coat.

Two grams of Basecoat Balancer ChromaBase 150K and 0.5 g of pigments as prepared above were mixed over a vortex for 1 minute, followed by ultrasonication for 30 minutes. The mixture was then transferred to A-250 mixer instrument and mixed for another 10 second to form a uniform paste. A drawdown method was applied for coating preparation using an applicator at a clearance of 8 mil (0.20 mm) onto the aluminum panels, followed by overnight curing at room temperature. The blackness of this panel was then measured as described above (before application of a clear coat). The blackness is over 156 My and is shown in FIG. 8.

Comparative samples were made by replacing the pigments according to embodiments disclosed and described herein with carbon black, cool black, commercial copper oxide, ball-milled copper oxide (commercial copper oxide that has been ball-milled to reduce the particle size), synthesized copper oxide, and copper oxide mixed with cobalt oxide. The blackness of these comparative samples are also shown in FIG. 8. As can be seen, the blackness of copper oxide coated cobalt oxide according to embodiments disclosed and described herein was similar to carbon black and well above the blackness of cool black, commercial copper oxide, ball-milled copper oxide (commercial copper oxide that has been ball-milled to reduce the particle size), copper oxide synthesized, and copper oxide mixed with cobalt oxide.

Figure 9:
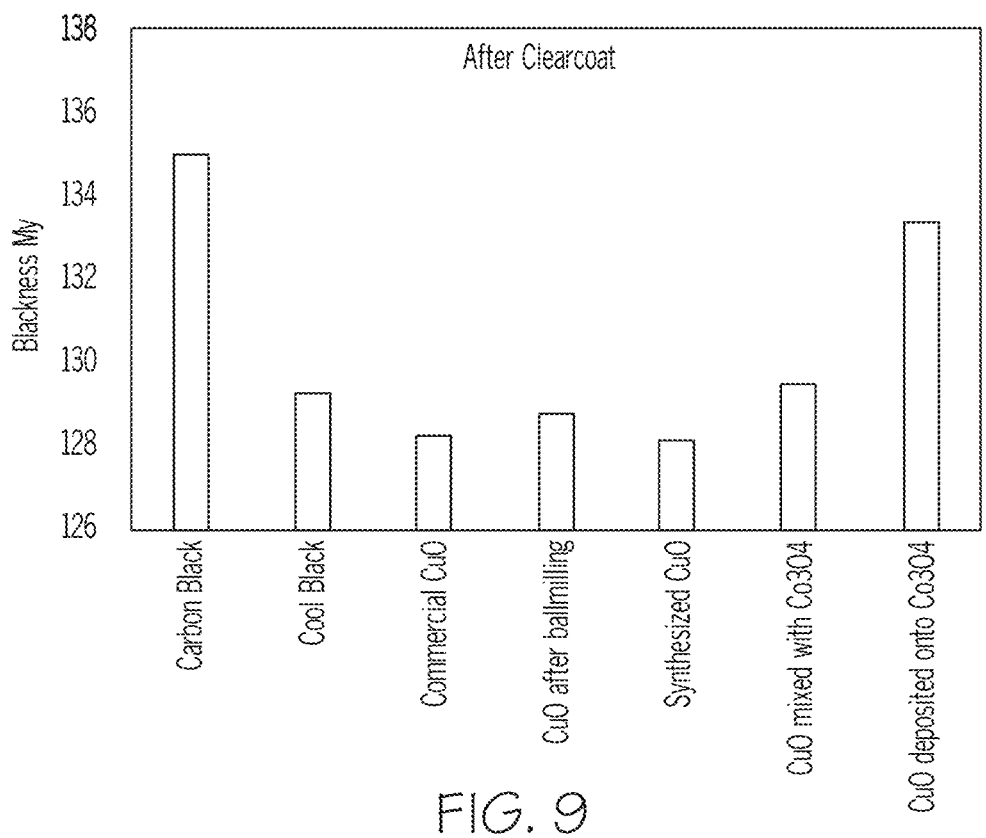
FIG. 9 is a bar graph showing blackness of panels with various pigments after applying a clear coat.

To apply a clear coat, PPG Deltron DC4000 and Deltron DCH 3085 were mixed at a ratio of 4:1 over a vortex for 1 min, followed by ultrasonication for 5 minutes. The mixture was then transferred to A-250 mixer instrument and mixed for another 30 second to form a homogenous transparent liquid. A drawdown method was applied for a clear coating over the above masstone coating by using an applicator at a clearance of 8 mil (0.20 mm), followed by 10 minutes curing at room temperature and 20 minutes curing at 60° C. The blackness of this panel was then measured as described above (after application of a clear coat). The blackness is over 132 My and is shown in FIG. 9. A clear coat was also applied to the comparative samples, and the blackness of these comparative samples with a clear coat was measured. The blackness of these comparative samples are also shown in FIG. 9. As can be seen, the blackness of copper oxide coated cobalt oxide according to embodiments disclosed and described was similar to carbon black and well above the blackness of cool black, commercial copper oxide, ball-milled copper oxide (commercial copper oxide that has been ball-milled to reduce the particle size), copper oxide synthesized, and copper oxide mixed with cobalt oxide.

Figure 10:
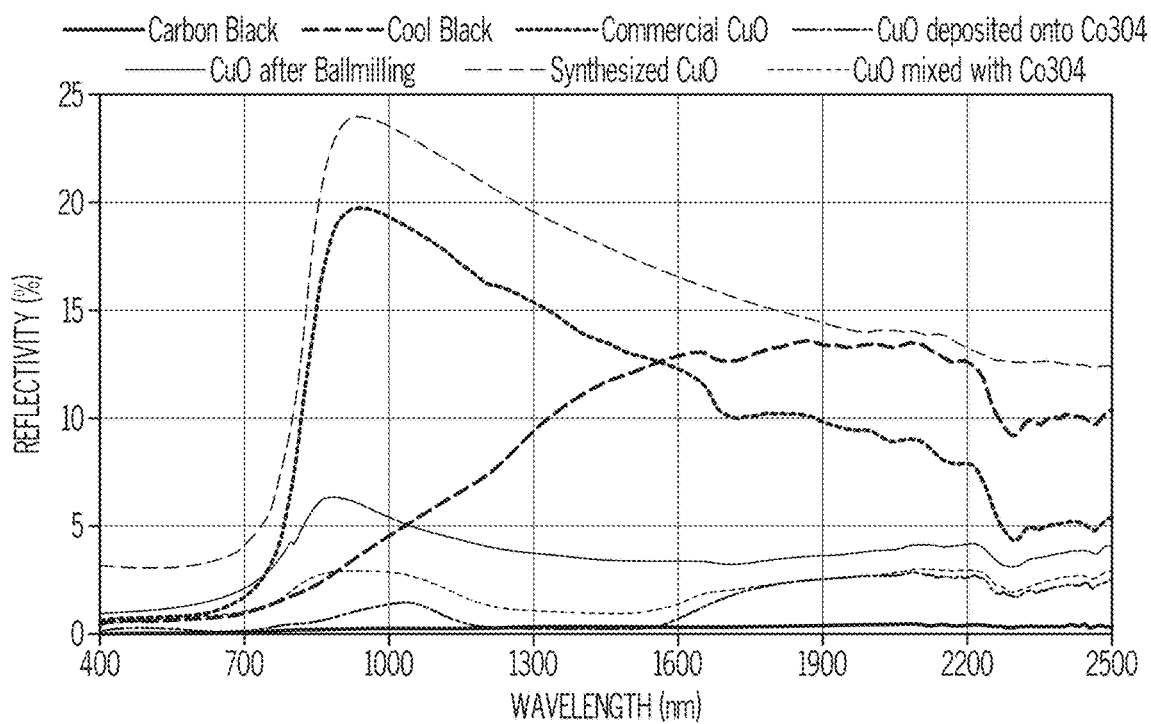
FIG. 10 is a line graph showing reflectivity of panels with various pigments after applying a clear coat.

The reflectivity of the panels with a clear coat using pigments with copper oxide coated cobalt oxide was measured as disclosed herein and is shown in FIG. 10. The reflectivity of the comparative samples was also measured and is reported in FIG. 10. As is shown, the reflectivity of the copper oxide coated cobalt oxide is nearly identical to carbon black in the visible spectrum, but has significantly more reflectivity in the near-IR and LiDAR electromagnetic radiation wavelength ranges than carbon black. It is also believed that the reflectivity of the panels with a clear coat using pigments with copper oxide coated cobalt oxide in the near-IR and LiDAR electromagnetic radiation wavelength ranges can be increased by increasing the loading of the pigments with copper oxide coated cobalt oxide within the paint system.

Figure 11:
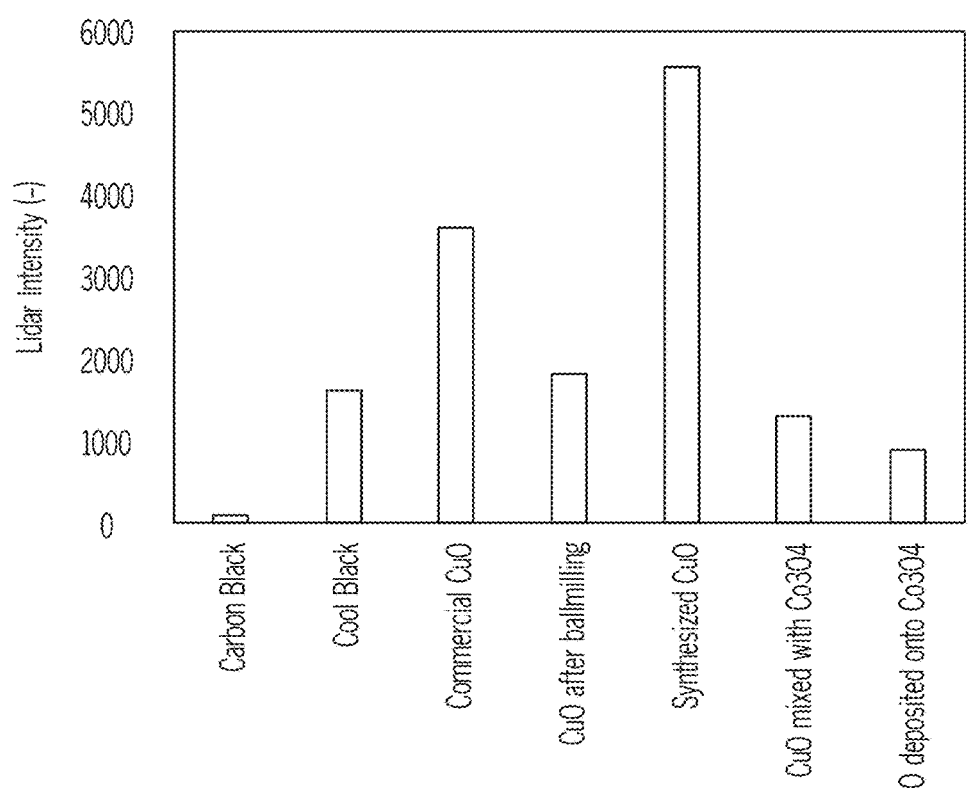
FIG. 11 is a bar graph showing LiDAR intensity of panels with various pigments after applying a clear coat.

The LiDAR intensity of the panels with a clear coat using pigments with copper oxide coated cobalt oxide was measured as disclosed herein and is shown in FIG. 11. The LiDAR intensity of the comparative samples was also measured and is reported in FIG. 11. As is shown, the LiDAR intensity of the copper oxide coated cobalt oxide is significantly higher than carbon black.

The above sample and comparative samples show that pigments formed from copper oxide coated cobalt oxide have blackness and reflectivity in the visible spectrum that is similar to carbon black, which is the current standard for many applications of black pigments (such as automotive paint systems). However, copper oxide coated cobalt oxide pigments also provide reflectivity in the near-IR and LiDAR electromagnetic wavelengths that exceeds that of carbon black. Accordingly, none of the carbon black, cool black, commercial copper oxide, ball-milled copper oxide, copper oxide synthesized, and copper oxide mixed with cobalt oxide used in the comparative samples can provide the balance of blackness and reflectivity in the near-IR and LiDAR electromagnetic wavelength ranges that was obtained by the copper oxide coated cobalt oxide disclosed and described herein.

Example 3—Copper Oxide Coated Carbon Black Pigments

Figure 12A:
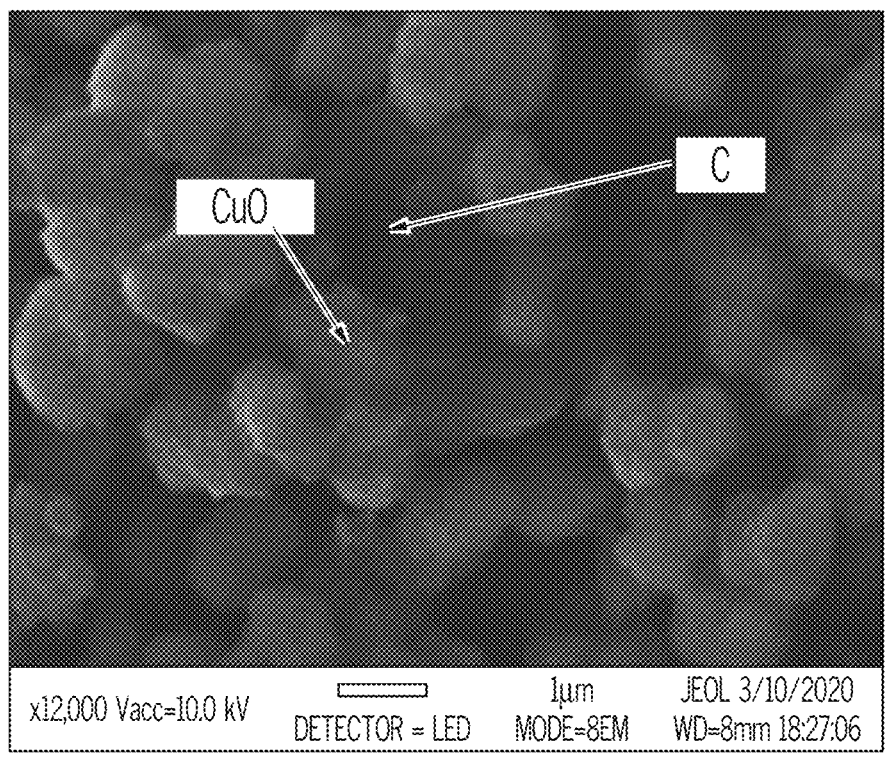
FIG. 12A to FIG. 12C are SEM images showing copper oxide coated carbon black according to embodiments disclosed and described herein.
Figure 12B:
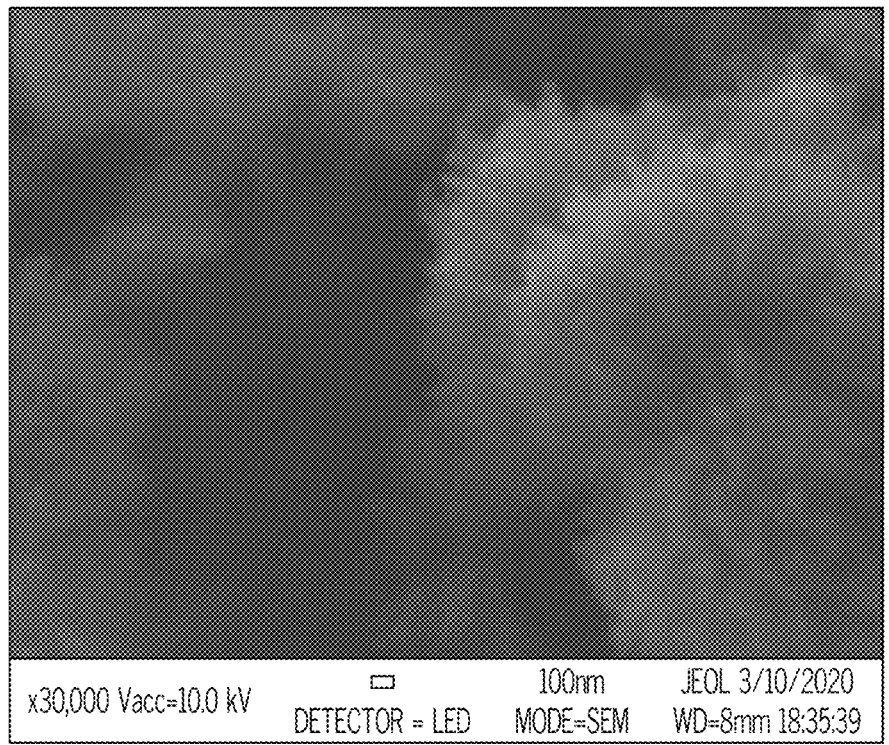
Figure 12C:
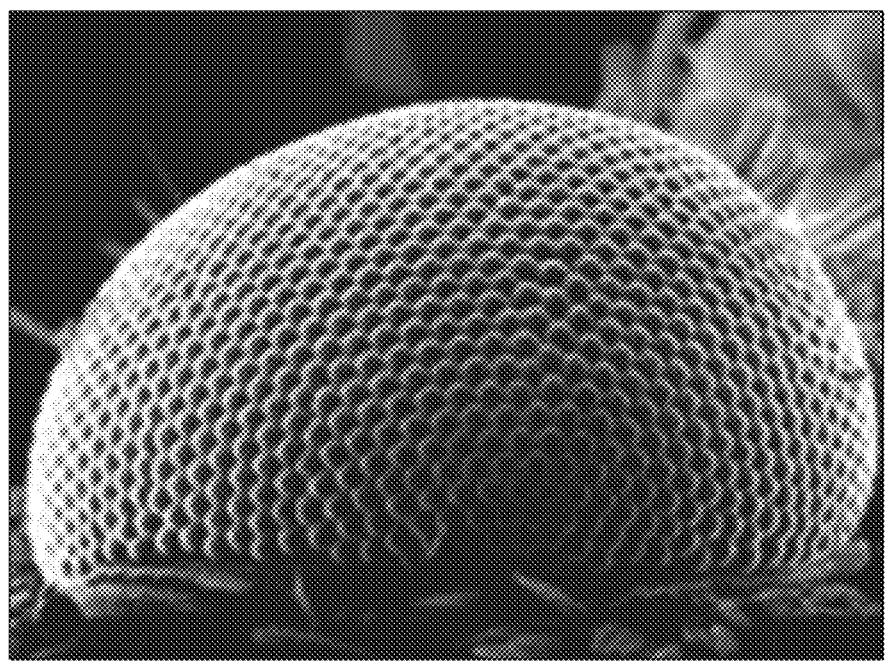

Copper oxide coated carbon black pigments were created by a wet chemistry method using $(NH_4)_2CO_3$ as a precipitating agent introduced into a solution comprising $Cu(NO_3)_2$ and carbon black particles. The weight ratio of $Cu(NO_3)_2$ to carbon black was 1:3 and the molar ratio of Cu to carbon was 0.07. The precipitating agent was added until precipitate was formed. The formed $CuCO_3$ coated onto the carbon black particles. Then the $(NH_4)_2NO_3$ was removed by washing the precipitate with water and ethanol. Then, the solution was filtered to obtain $CuCO_3$ coated carbon black particles. The precipitate was dried at 120° C. for 12 hours followed by calcination at a temperature of 300° C. for 3 hours to form CuO coated carbon black particles. An scanning electron microscope (SEM) image of the resulting 25:75 CuO:C ratio copper oxide coated carbon black is shown in FIG. 12A. More detailed SEM images shown in FIG. 12B and FIG. 12C shown an antireflection moth-eye structure of the 25:75 CuO:C ratio copper oxide coated carbon black.

Figure 13:
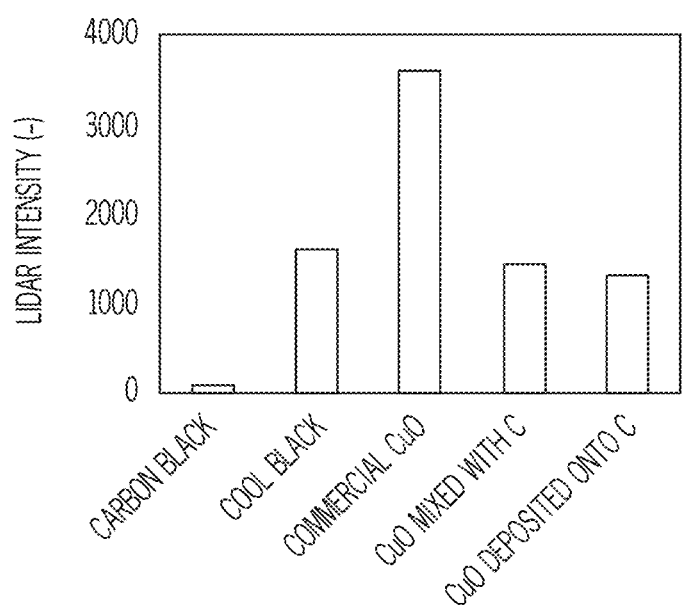
FIG. 13 is a bar graph showing LiDAR intensity of panels with various pigments after applying a clear coat.

The LiDAR intensity of the 25:75 CuO:C ratio copper oxide coated carbon black formed as described above was measured against standard carbon black, cool black, commercial CuO, a physical mixture of 25:75 ratio CuO and carbon black (CuO mixed with C in FIG. 13), and a 25:75 ratio CuO coated carbon black (CuO deposited onto C in FIG. 13). The LiDAR intensity was measured as described above after applying a clear coat. The results of this test are shown in FIG. 13. As shown in FIG. 13, the 25:75 ratio CuO coated carbon black has a LiDAR intensity significantly better than carbon black, but less than cool black and commercial CuO. However, cool black and commercial CuO do not have a blackness that is comparable with 25:75 ratio CuO coated carbon black, as shown in FIG. 4B. Thus, 25:75 ratio CuO coated carbon black provides a significantly improved balance of LiDAR intensity and blackness that cannot be achieved by any of carbon black, cool black, commercial CuO, or a physical mixture of CuO and carbon black.

Example 4

To validate the performance of the CuO coated carbon black as disclosed in Example 3 under a dynamic environment, a robot (Model TurtleBot 3 Burger) was equipped with a 2D laser scanner at 905 nm. The laser scanner is capable of sensing 360 degrees that collects a set of data around the robot to use for Simultaneous Localization and Mapping (SLAM) and Navigation, as well as performing stop when an obstacle is detected. A paint panel was placed in front of autonomous robot. When the panel was painted with carbon black, the robot ran into the obstacle without stopping. However, when the panel was painted with copper oxide coated carbon black as made according to Example 3, the robot stopped before striking the panel.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for forming a copper coated particles comprising:
    combining a precipitating agent with a solution comprising copper nitrate and particles, wherein the particles are cobalt oxide ($Co_3O_4$) or carbon black, thereby forming coated particles;
    washing the coated particles, thereby obtaining washed coated particles;
    filtering the washed coated particles, thereby obtaining filtered coated particles;
    drying the filtered coated particles, thereby obtaining dried coated particles; and
    calcining the dried coated particles to form the copper coated particles, wherein
    the copper coated particles have a reflectivity of electromagnetic radiation in a visible spectrum that is less than or equal to 5%, and
    the copper coated particles have a reflectivity of electromagnetic radiation in a near-IR and LiDAR spectrum that is greater than or equal to 5%.

2. The method of claim 1, wherein the precipitating agent is selected from the group consisting of sodium hydroxide, sodium carbonate, and ammonium carbonate.

3. The method of claim 2, wherein the precipitating agent is ammonium carbonate.

4. The method of claim 1, wherein the particles are cobalt oxide ($Co_3O_4$).

5. The method of claim 4, wherein drying the filtered coated particles comprises drying the filtered coated particles at a temperature greater than or equal to 100° C. and less than or equal to 140° C. for a duration greater than or equal to 0.5 hours and less than or equal to 5.0 hours.

6. The method of claim 5, wherein calcining the dried coated particles comprises calcining the dried coated particles at a temperature greater than or equal to 430° C. and less than or equal to 470° C. for a duration greater than or equal to 0.5 hours and less than or equal to 5.0 hours.

7. The method of claim 1, wherein the particles are carbon black particles.

8. The method of claim 7, wherein drying the filtered coated particles comprises drying the filtered coated particles at a temperature greater than or equal to 100° C. and less than or equal to 140° C. for a duration greater than or equal to 5 hours and less than or equal to 15 hours.

9. The method of claim 8, wherein calcining the dried coated particles comprises calcining the dried coated particles at a temperature greater than or equal to 200° C. and less than or equal to 300° C. for a duration greater than or equal to 0.5 hours and less than or equal to 5.0 hours.

10. The method of claim 1, wherein the copper coated particles comprise copper nitrate coated particles, copper hydroxide coated particles, or copper carbonate coated particles.

11. The method of claim 1, wherein washing the coated particles comprises washing the coated particles in a mixture of ethanol and water.

* * * * *